United States Patent
Yoshida et al.

(10) Patent No.: US 7,575,696 B2
(45) Date of Patent: Aug. 18, 2009

(54) LIQUID CRYSTAL COMPOSITION AND ANISOTROPIC MATERIAL

(75) Inventors: Aiko Yoshida, Minami-ashigara (JP); Shigeki Uehira, Minami-ashigara (JP); Hiroshi Takeuchi, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 11 days.

(21) Appl. No.: 11/829,268

(22) Filed: Jul. 27, 2007

(65) Prior Publication Data

US 2008/0023670 A1 Jan. 31, 2008

(30) Foreign Application Priority Data

Jul. 28, 2006 (JP) ............................... 2006-206266

(51) Int. Cl.
*C09K 19/38* (2006.01)
*C09K 19/52* (2006.01)
*C09K 19/54* (2006.01)

(52) U.S. Cl. ............................... 252/299.01; 252/299.5

(58) Field of Classification Search ............ 252/299.01, 252/299.5; 428/1.1, 1.3
See application file for complete search history.

(56) References Cited

U.S. PATENT DOCUMENTS

| 6,380,996 B1 * | 4/2002 | Yokoyama et al. .......... 349/117 |
| 2003/0160210 A1 | 8/2003 | Bremer et al. |
| 2007/0298192 A1 * | 12/2007 | Uehira et al. ................ 428/1.3 |

FOREIGN PATENT DOCUMENTS

| JP | 2000-098133 A | 4/2000 |
| JP | 2000-155216 A | 6/2000 |
| JP | 2002-296423 A | 10/2002 |
| JP | 2003-261511 A | 9/2003 |

* cited by examiner

*Primary Examiner*—Shean C Wu
(74) *Attorney, Agent, or Firm*—Buchanan Ingersoll & Rooney PC

(57) ABSTRACT

A liquid crystal composition, containing a compound represented by formula (I) and a compound represented by formula (II); and an anisotropic material containing the liquid crystal composition:

Q1-SP1-X1-MG-X2-SP2-Q2    Formula (I)

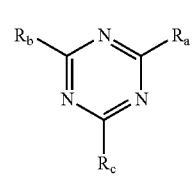

Formula (II)

wherein, Q1 and Q2 represent a polymerizable group, SP1 and SP2 represent a spacer group, X1 and X2 represent a linking group, MG represents a mesogen group, $R_a$, $R_b$ and $R_c$ represent $-L_1-R_1$, $-L_2-R_2$ or —NHR, at least one of $R_a$, $R_b$ and $R_c$ is —NHR, $L_1$ and $L_2$ represent a single bond or a divalent linking group, $R_1$ and $R_2$ represent a hydrogen atom or a substituent, and R represents a group having a polymerizable group.

9 Claims, No Drawings

LIQUID CRYSTAL COMPOSITION AND ANISOTROPIC MATERIAL

FIELD OF THE INVENTION

The present invention relates to a liquid crystal composition and an anisotropic material obtained by fixing orientation of the liquid crystal composition.

BACKGROUND OF THE INVENTION

Liquid crystalline compounds have been utilized as an important material that functions as an optical shutter in a liquid crystal display device represented by so-called liquid crystal display and the like. Recently, various kinds of optical compensating materials have been developed in order to improve display characteristic, especially display characteristic at the time when the display is viewed from oblique directions (see, for example, JP-A-2000-155216 ("JP-A" means unexamined published Japanese patent application) and JP-A-2000-98133). The optical compensating materials are prepared by orientating a low-molecular liquid crystal material and then fixing the formed orientation, as well as by stretching a polymer or orienting a liquid crystal polymer (see, for example, JP-A-2003-261511). The method of using a low-molecular liquid crystal material has such excellent advantages that relatively high orientation speed is achieved and optical characteristics are hardly changed by virtue of fixation of orientation made by the use of polymerization reaction or the like, compared to the method using the liquid crystal polymer material. In the case of using the low-molecular liquid crystal material, optical characteristics are affected by orientation of the liquid crystalline compounds. Therefore, in some cases, various additives are used in combination with the low-molecular liquid crystal material in order to regulate the orientation. Further, in some cases, a multi-functional monomer is used in combination with the low-molecular liquid crystal material in order to increase film strength (see, for example, JP-A-2002-296423).

However, the method, in which a low-molecular liquid crystal material is oriented, and then the orientation is fixed, sometimes causes defects owing to turbulence of orientation at the time of fixation of the orientation, which results in deterioration of optical characteristics. Besides, the additives that are added to regulate the orientation of liquid crystal materials or to increase film strength sometimes reduces a phase transition temperature of the liquid crystal, or necessitates to increase a film thickness owing to deterioration of optical characteristics, or causes deterioration of optical characteristics owing to phase separation. Accordingly, there is a demand for improvement in theses problems.

SUMMARY OF THE INVENTION

The present invention resides in a liquid crystal composition, containing at least one compound represented by formula (I) and at least one compound represented by formula (II):

Q1-SP1-X1-MG-X2-SP2-Q2     Formula (I)

wherein Q1 and Q2 each independently represent a polymerizable group, SP1 and SP2 each independently represent a spacer group, X1 and X2 each independently represent a linking group, and MG represents a mesogen group, and

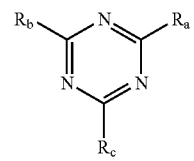

Formula (II)

wherein $R_a$, $R_b$ and $R_c$ each independently represent $-L_1-R_1$, $-L_2-R_2$ or —NHR; at least one of $R_a$, $R_b$ and $R_c$ is —NHR group; $L_1$ and $L_2$ each independently represent a single bond or a divalent linking group; $R_1$ and $R_2$ each independently represent a hydrogen atom or a substituent; and R represents a group having a polymerizable group.

Further, the present invention resides in an anisotropic material containing the above-described liquid crystal composition.

Other and further features and advantages of the invention will appear more fully from the following description.

DETAILED DESCRIPTION OF THE INVENTION

As a result of intensive studies to solve the above-described problems, the present inventors have found to solve the problems by addition of compounds having a specific structure. The present invention was made on the basis of this finding.

According to the present invention, there is provided the following means:

(1) A liquid crystal composition, comprising at least one compound represented by formula (I) and at least one compound represented by formula (II):

Q1-SP1-X1-MG-X2-SP2-Q2     Formula (I)

wherein Q1 and Q2 each independently represent a polymerizable group, SP1 and SP2 each independently represent a spacer group, X1 and X2 each independently represent a linking group, and MG represents a mesogen group, and

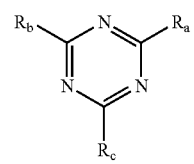

Formula (II)

wherein $R_a$, $R_b$ and $R_c$ each independently represent $-L_1-R_1$, $-L_2-R_2$ or —NHR; at least one of $R_a$, $R_b$ and $R_a$ is —NHR group; $L_1$ and $L_2$ each independently represent a single bond or a divalent linking group; $R_1$ and $R_2$ each independently represent a hydrogen atom or a substituent; and R represents a group having a polymerizable group;

(2) The liquid crystal composition as described in the above item (1), wherein two or three of $R_a$, $R_b$ and $R_c$ in formula (II) are —NHR;

(3) The liquid crystal composition as described in the above item (1) or (2), wherein the compound represented by formula (II) is a polymerizable compound represented by formula (III):

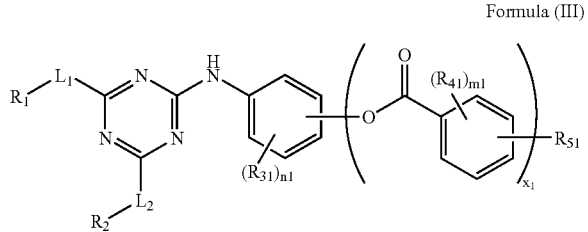

Formula (III)

wherein $L_1$ and $L_2$, which may be the same or different from each other, each independently represent a single bond or a divalent linking group; $R_1$ and $R_2$ each independently represent a hydrogen atom or a substituent; $R_{31}$ and $R_{41}$, which may be the same or different from each other, each independently represent a substituent; n1 represents an integer of 0 (zero) to 4; when n1 is 2 or more, $R_{31}$'s may be the same or different from each other, or $R_{31}$'s may form a ring, if possible; m1 represents an integer of 0 (zero) to 4; when m1 is 2 or more, $R_{41}$'s may be the same or different from each other, or $R_{41}$'s may form a ring, if possible; $X_1$ represents an integer of 0 (zero) to 5; when $X_1$ is 2 or more, $(R_{41})_{m1}$'s may be the same or different from each other; and $R_{51}$ represents an alkoxy group, an alkoxycarbonyl group or an alkoxycarbonyloxy group, each of which has a group represented by P1, P2 or P3, in which an alkoxy moiety of the group represented by $R_{51}$ may have an ether bond therein:

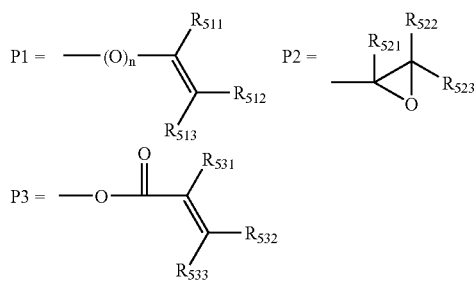

wherein $R_{511}$, $R_{512}$, $R_{513}$, $R_{521}$, $R_{522}$, $R_{523}$, $R_{531}$, $R_{532}$ and $R_{533}$ each independently represent a hydrogen atom or an alkyl group; and n represents 0 (zero) or 1;

(4) The liquid crystal composition as described in any one of the above items (1) to (3), wherein the compound represented by formula (II) is a polymerizable compound represented by formula (IV):

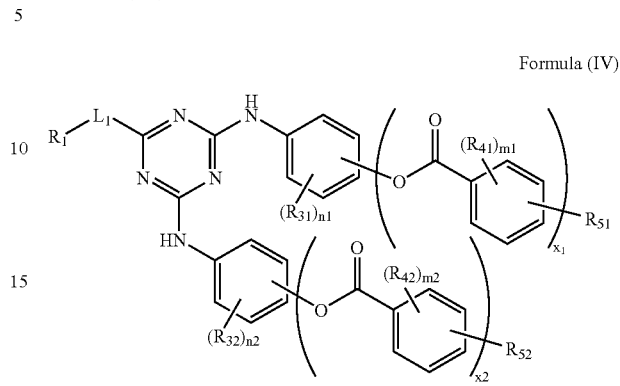

Formula (IV)

wherein $L_1$ represents a single bond or a divalent linking group; $R_1$ represents a hydrogen atom or a substituent; $R_{31}$, $R_{32}$, $R_{41}$, and $R_{42}$, which may be the same or different from each other, each independently represent a substituent; n1 and n2 each independently represent an integer of 0 (zero) to 4; when n1 is 2 or more, $R_{31}$'s may be the same or different from each other, or $R_{31}$'s may form a ring, if possible; when n2 is 2 or more, $R_{32}$'s may be the same or different from each other, or $R_{32}$'s may form a ring, if possible; m1 and m2 each independently represent an integer of 0 (zero) to 4; when m1 is 2 or more, $R_{41}$'s may be the same or different from each other, or $R_{41}$'s may form a ring, if possible; when m2 is 2 or more, $R_{42}$'s may be the same or different from each other, or $R_{42}$'s may form a ring, if possible; $X_1$ and $X_2$ each independently represent an integer of 0 (zero) to 5; when $X_1$ is 2 or more, $(R_{41})_{m1}$'s may be the same or different from each other; when $X_2$ is 2 or more, $(R_{42})_{m2}$'s may be the same or different from each other; and $R_{51}$ and $R_{52}$ each independently represent an alkoxy group, an alkoxycarbonyl group or an alkoxycarbonyloxy group, each of which has a group represented by the aforementioned P1, P2 or P3, in which an alkoxy moiety of the group represented by $R_{51}$ may have an ether bond therein;

(5) The liquid crystal composition as described in any one of the above items (1) to (4), wherein the compound represented by formula (II) is a polymerizable compound represented by formula (V):

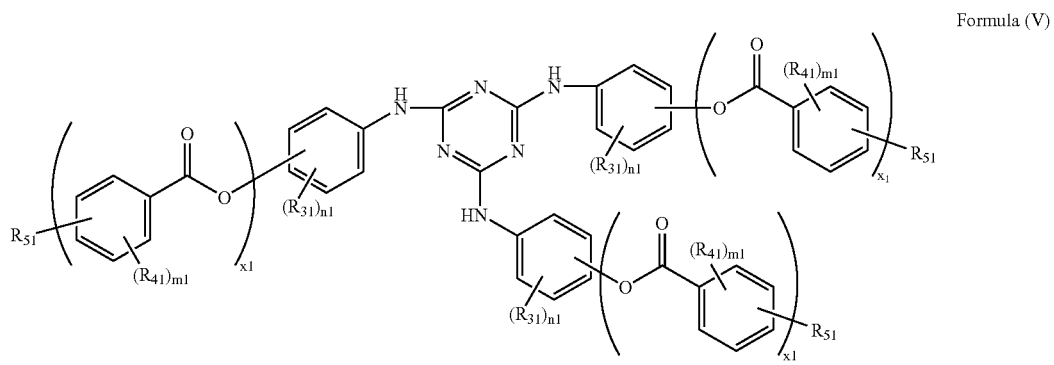

Formula (V)

wherein $R_{31}$ and $R_{41}$, which may be the same or different from each other, each independently represent a substituent; n1 represents an integer of 0 (zero) to 4; when n1 is 2 or more, $R_{31}$'s on a single benzene ring may be the same or different from each other, or may form a ring, if possible; m1 represents an integer of 0 (zero) to 4; when m1 is 2 or more, $R_{41}$'s on a single benzene ring may be the same or different from each other, or may form a ring, if possible; $X_1$ represents an integer of 0 (zero) to 5; when $X_1$ is 2 or more, a series of $(R_{41})_{m1}$'s may be the same or different from each other; and $R_{51}$ represents an alkoxy group, an alkoxycarbonyl group or an alkoxycarbonyloxy group, each of which has a group represented by the aforementioned P1, P2 or P3, in which an alkoxy moiety of the group represented by $R_{51}$ may have an ether bond therein;

(6) The liquid crystal composition as described in any one of the above items (1) to (5), wherein the compound represented by formula (II) exhibits liquid crystallinity by itself;

(7) The liquid crystal composition as described in any one of the above items (1) to (6), further comprising at least one compound represented by formula (VI):

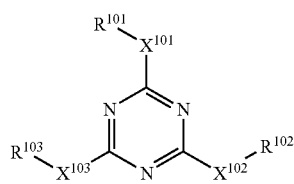

Formula (VI)

wherein $R^{101}$, $R^{102}$ and $R^{103}$ each independently represent a hydrogen atom or a substituent; and $X^{101}$, $X^{102}$ and $X^{103}$ each independently represent a single bond or a divalent linking group; and (8) An anisotropic material, comprising the liquid crystal composition as described in any one of the above items (1) to (7), wherein liquid crystals of the liquid crystal composition are orientated and fixed.

Herein, the term "liquid crystallinity" means liquid crystallinity as described, for example, in "Ekisyo Binran (Liquid Crystal Handbook)", published by Maruzen. With respect to the liquid crystallinity, many phases are classified into groups, each of which has unique characteristics. The compound having liquid crystallinity in the present invention may have any of the phases as described in the handbook, and the compound of the present invention is preferably a compound showing nematic phase (N), or smectic phase (smectic A phase (SmA) or smectic C phase (SmC)).

The present invention is explained in detail below.

Here, in the present specification, a numerical range represented by using "to" denotes a range including numerical values described before and after it as a minimum value and a maximum value.

First, the compound represented by formula (I) is explained below.

Q1-SP1-X1-MG-X2-SP2-Q2    Formula (I)

In formula (I), Q1 and Q2 each independently represent a polymerizable group, SP1 and SP2 each independently represent a spacer group, and X1 and X2 each independently represent a linking group, and MG represents a mesogen group.

Q1 and Q2 each independently represent a polymerizable group. The polymerizable group is preferably polymerized by an addition polymerization including a ring-opening polymerization, or a condensation polymerization. In other words, the polymerizable group is preferably a functional group capable of the addition polymerization or the condensation polymerization. Examples of the polyrmerizable group are set forth below.

—CH=CH$_2$ (Q-1)

—CH=CH—CH$_3$ (Q-2)

—CH=CH—C$_2$H$_5$ (Q-3)

—CH=CH-n-C$_3$H$_7$ (Q-4)

—CH=CH$_2$ 
|
CH$_3$ (Q-5)

—CH=C—CH$_3$
|
CH$_3$ (Q-6)

—C≡CH (Q-7)

—CH—CH$_2$ (with O bridge) (Q-8)

—CH—CH$_2$ (with NH bridge) (Q-9)

—SH (Q-10)

—CHO (Q-11)

—OH (Q-12)

—CO$_2$H (Q-13)

—N=C=O (Q-14)

—NH$_2$ (Q-15)

—SO$_3$H (Q-16)

—N=C=S (Q-17)

As the polymerizable group (Q1 and Q2), an unsaturated polymerizable group (e.g., (Q-1) to (Q-7)), an epoxy group (e.g., (Q-8)), and an aziridinyl group (e.g., (Q-9)) are preferable; an unsaturated polymerizable group is more preferable; and an ethylenically unsaturated polymerizable group (e.g., (Q-1) to (Q-6)) is most preferable.

In formula (I), SP1 and SP2 each independently represent a divalent spacer group. For example, SP1 and SP2 each are preferably represent a divalent linking group selected from the group consisting of —O—, —S—, —CO—, —NR'—, a divalent chain group and a group made by any combination of two or more thereof. Here, R' represents an alkyl group having 1 to 7 carbon atoms, or a hydrogen atom. Examples of the divalent linking group consisting of the group made by any combination of these groups are set forth below.

The left side of the divalent linking group bonds to Q1 or Q2, while the right side of the divalent linking group bonds to X1 or X2. It is preferable from a synthetic viewpoint that the —CO—O— structure is arranged at the Q1 or Q2 side, as shown in the following L-1 to L-3.

—CO—O-(divalent chain group)-     L-1

—CO—O-(divalent chain group)-O-(divalent chain group)-     L-2

—CO—O-(divalent chain group)-S-(divalent chain group)-     L-3

The term "divalent chain group" means an alkylene group, a substituted alkylene group, an alkenylene group, a substituted alkenylene group, an alkynylene group, or a substituted alkynylene group. Among these, an alkylene group, a substituted alkylene group, an alkenylene group, and a substituted alkenylene group are preferable; and are an alkylene group and an alkenylene group are more preferable. The alkylene group may be branched. The number of carbon atoms in the alkylene group is preferably from 2 to 12, more preferably from 2 to 10, and most preferably from 2 to 8. An alkylene moiety of the substituted alkylene group has the same meanings as the above-mentioned alkylene group. Examples of the substituent of the substituted alkylene group include an alkoxy group and a halogen atom. The alkenylene group may be branched. The number of carbon atoms in the alkenylene group is preferably from 2 to 12, more preferably from 2 to 10, and most preferably from 2 to 8. An alkenylene moiety of the substituted alkenylene group has the same meanings as the above-mentioned alkenylene group. Examples of the substituent of the substituted alkenylene group include an alkoxy group and a halogen atom. The alkynylene group may be branched. The number of carbon atoms in the alkynylene group is preferably from 2 to 12, more preferably from 2 to 10, and most preferably from 2 to 8. An alkynylene moiety of the substituted alkynylene group has the same meanings as the above-mentioned alkynylene group. Examples of the substituent of the substituted alkynylene group include an alkoxy group and a halogen atom.

In formula (I), X1 and X2 each independently represent a divalent linking group It is preferable that X1 and X2 each independently represent a divalent linking group selected from the group consisting of a single bond, —O—, —S—, —CO—, —NR' (R' has the same meanings as described above) and a group made by any combination of two or more thereof. X1 and X2 each are preferably a single bond, —O—, —CO—O—, —O—CO—, —CO—NH—, —NH—CO— or —O—CO—O—.

In formula (I), MG represents a mesogen group. The mesogen group is preferably represented by formula (MG-I) set forth below.

-(A1-$Z^1$)m-A2-$Z^2$-A3-     MG-1

In formula (MG-1), A1, A2 and A3 each independently represent a 1,4-phenylene group, a heterocyclic group in which one, or two or more CH groups of a 1,4-phenylene group have been replaced by a nitrogen atom (N), a 1,4-cyclohexylene group, a heterocyclic group in which one $CH_2$ group, or two $CH_2$ groups that are not adjacent to each other of a 1,4-cyclohexylene group have been replaced by an oxygen atom (O) and/or a sulfur atom (S), a 1,4-cyclohexenylene group, or a naphthalene-2,6-diyl group. These groups may have a substituent. $Z^1$ and $Z^2$ each independently represent —COO—, —OCO—, —$CH_2CH_2$—, —$OCH_2$—, —$CH_2O$—, —CH=CH—, —C≡C—, —CH=CH—COO—, —OCO—CH=CH— or a single bond. m represents an integer of 0, 1 or 2.

As the mesogen group, dicyclic or tricyclic mesogen groups are preferable. Especially preferred are compounds in which Z1 and Z2 each represent —COO—, —OCO—, —$CH_2$—$CH_2$—, —CH=CH—COO—, —OCO—CH=CH—, or a single bond.

Examples of preferable mesogen groups represented by MG-1 are set forth below. For simplification, abbreviations are used. Here, "Phe" represents 1,4-phenylene, and "PheL" represents a 1,4-phenylene substituted with at least one substituent L, and "Cyc" represents for 1,4-cyclohexylene.

| | |
|---|---|
| -Phe-$Z^2$-Phe- | II-1 |
| -Phe-$Z^2$-Cyc- | II-2 |
| -PheL-$Z^2$-Phe- | II-3 |
| -PheL-$Z^2$-Cyc- | II-4 |
| -Phe-$Z^2$-PheL- | II-5 |
| -Phe-$Z^1$-Phe-Phe- | II-6 |
| -Phe-$Z^1$-Phe-Cyc- | II-7 |
| -Phe-$Z^1$-Phe-$Z^2$-Phe- | II-8 |
| -Phe-$Z^1$-Phe-$Z^2$-Cyc- | II-9 |
| -Phe-$Z^1$-Cyc-$Z^2$-Phe- | II-10 |
| -Phe-$Z^1$-Cyc-$Z^2$-Cyc- | II-11 |
| -Phe-$Z^1$-PheL-$Z^2$-Phe- | II-12 |
| -Phe-$Z^1$-Phe-$Z^2$-PheL- | II-13 |
| -PheL-$Z^1$-Phe-$Z^2$-PheL- | II-14 |
| -PheL-$Z^1$-PheL-$Z^2$-Phe- | II-15 |
| -PheL-$Z^1$-PheL-$Z^2$-PheL- | II-16 |

Among these, $Z^1$ and $Z^2$ each are preferably —COO—, —OCO—, —$CH_2CH_2$—, —CH=CH—COO— or a single bond.

Especially preferable mesogen groups are the following groups.

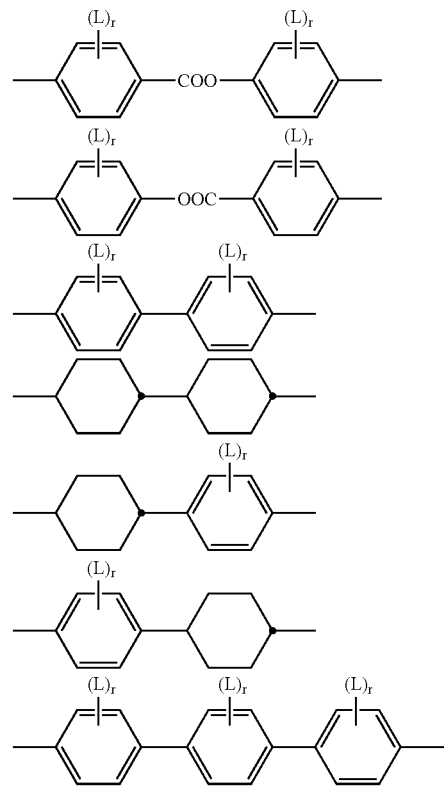

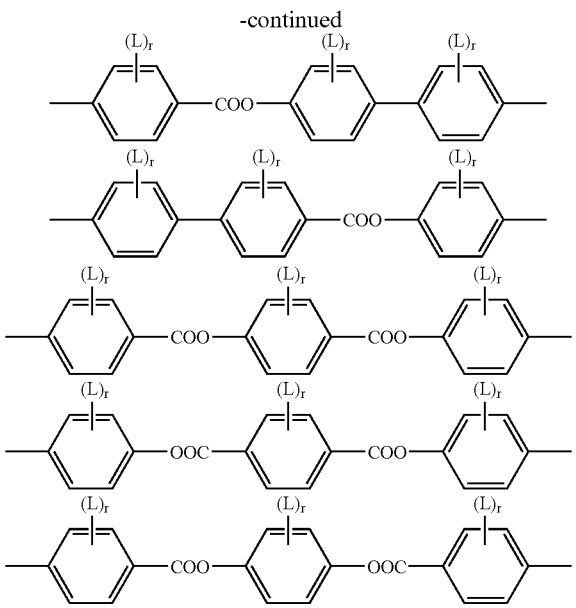

Here, r represents an integer of 0 to 4, and r is preferably 0, 1 or 2. When r is 2 or more, L's may be the same or different.

Next, the substituent L is explained.

Example of the substituent represented by L include a halogen atom, a cyano group, a nitro group, an alkyl group having 1 to 5 carbon atoms, a halogen-substituted alkyl group having 1 to 5 carbon atoms, an alkoxy group having 1 to 5 carbon atoms, an alkylthio group having 1 to 5 carbon atoms, an acyl group having 1 to 5 carbon atoms, an acyloxy group having 2 to 6 carbon atoms, an alkoxycarbonyl group having 2 to 6 carbon atoms, a carbamoyl group, an alkyl-substituted carbamoyl group having 2 to 6 carbon atoms and an amide group having 2 to 6 carbon atoms. The substituent is more preferably a halogen atom, a cyano group, an alkyl group having 1 to 3 carbon atoms, a halogen-substituted alkyl group having 1 to 3 carbon atoms, an alkoxy group having 1 to 3 carbon atoms or an acyloxy group having 2 to 4 carbon atoms.

L is preferably —F, —Cl, —Br, —CN, —NO$_2$, —CH$_3$, —C$_2$H$_5$, —OCH$_3$, —OC$_2$H$_5$, —COCH$_3$, —COC$_2$H$_5$, —CF$_3$, —OCF$_3$, —OCHF$_2$ or —OC$_2$F$_5$; more preferably —F, —Br, —Cl, —CN, —CH$_3$, —C$_2$H$_5$, —OCH$_3$, —COCH$_3$ or —OCF$_3$; and most preferably —F, —Br, —CH$_3$, —OCH$_3$ or —COCH$_3$.

Specific examples of the compounds are shown below. However, the present invention should not be construed as being limited to the compounds set forth below.

(I-1)

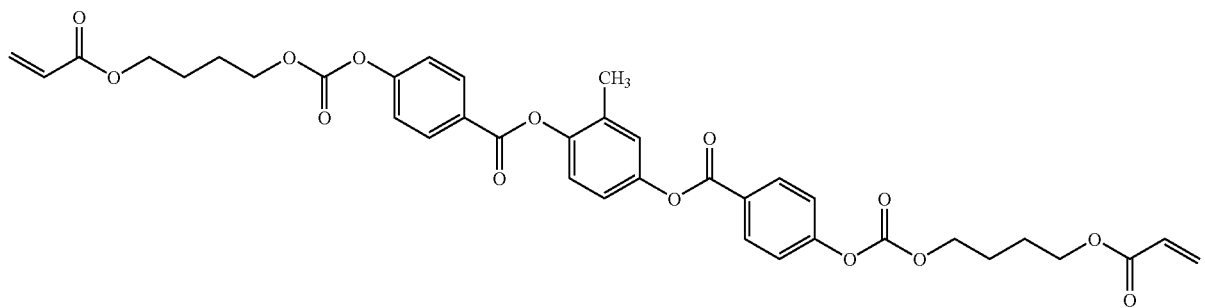

(I-2)

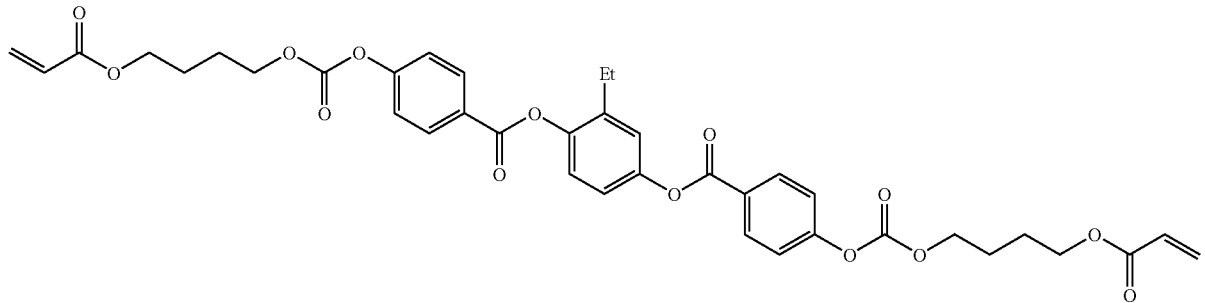

(I-3)
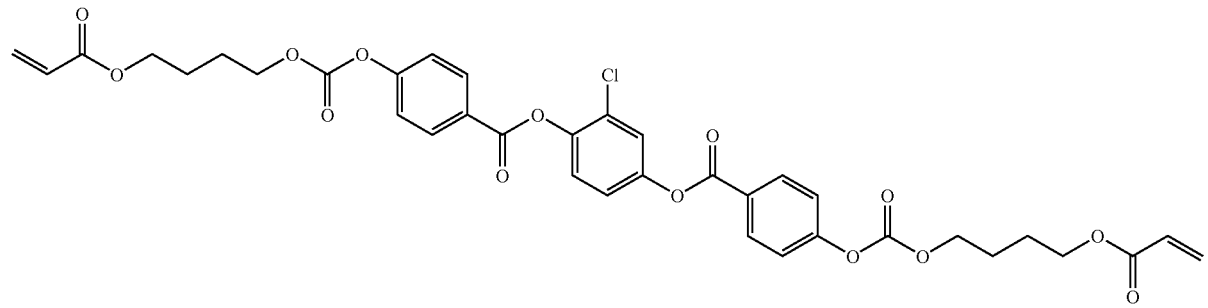
(I-4)
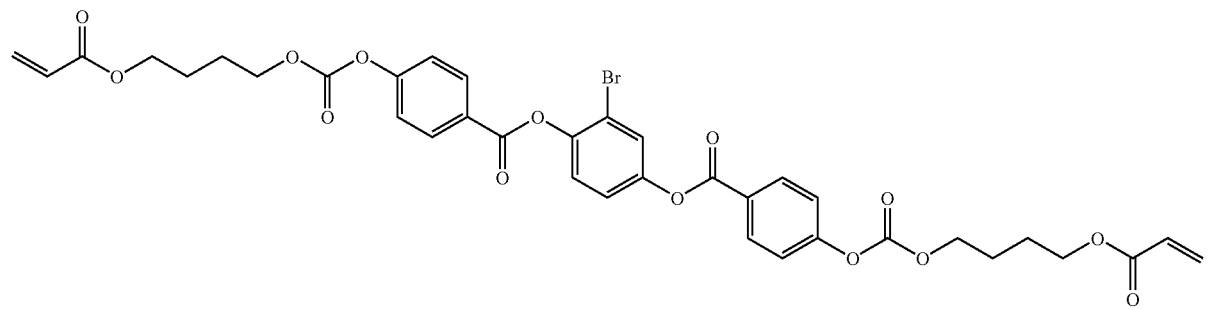
(I-5)
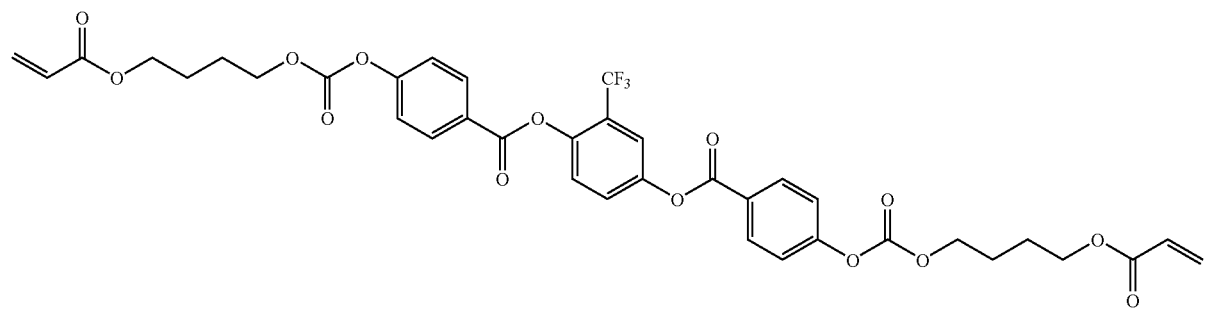
(I-6)
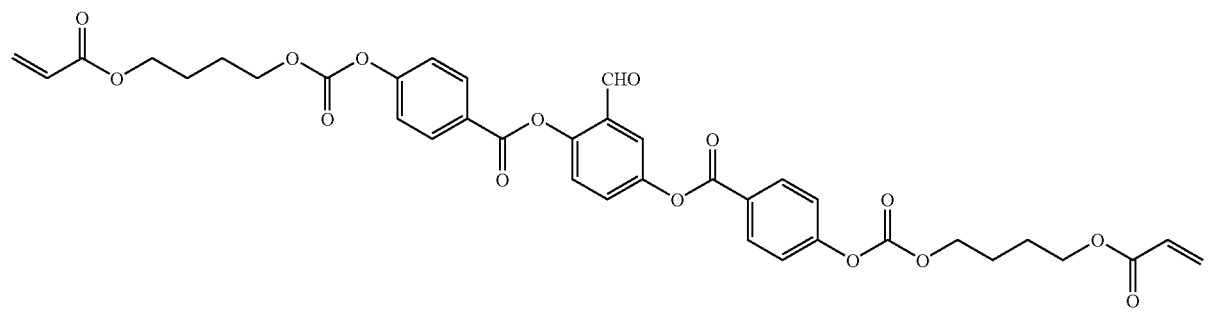

(I-7)
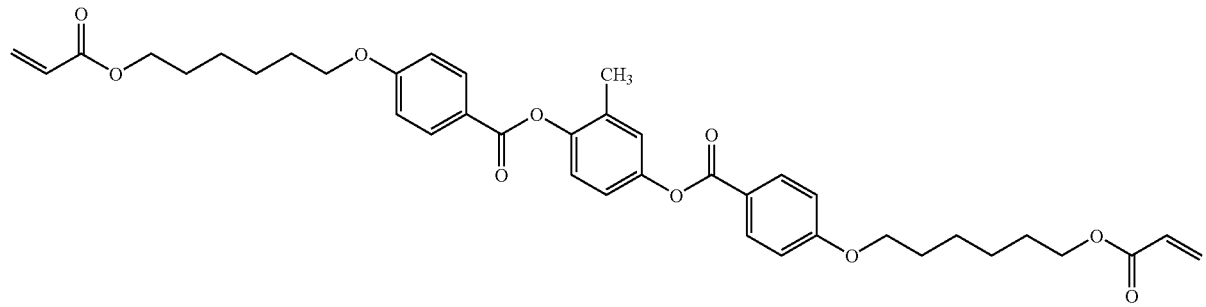
(I-8)
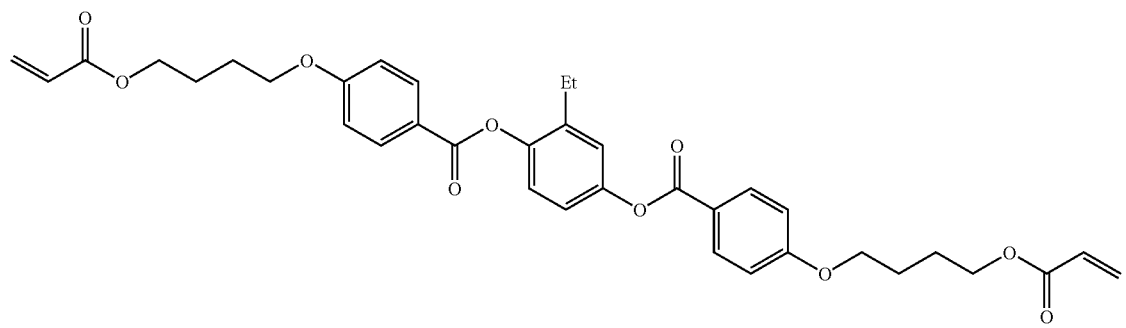
(I-9)
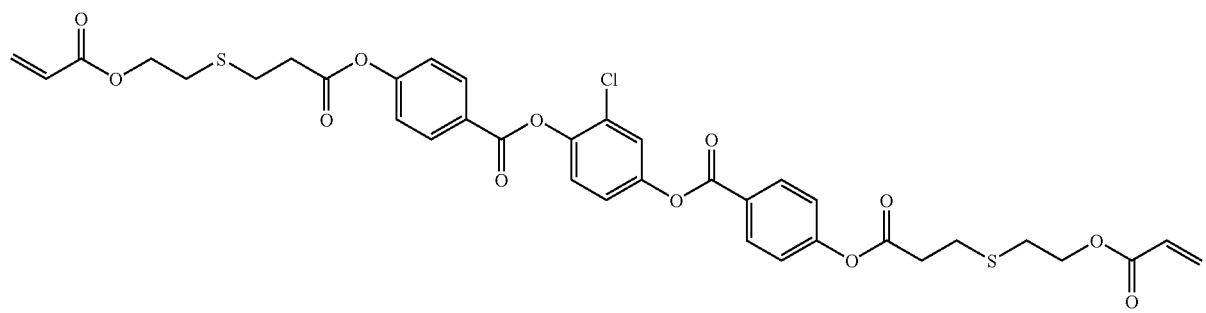
(I-10)
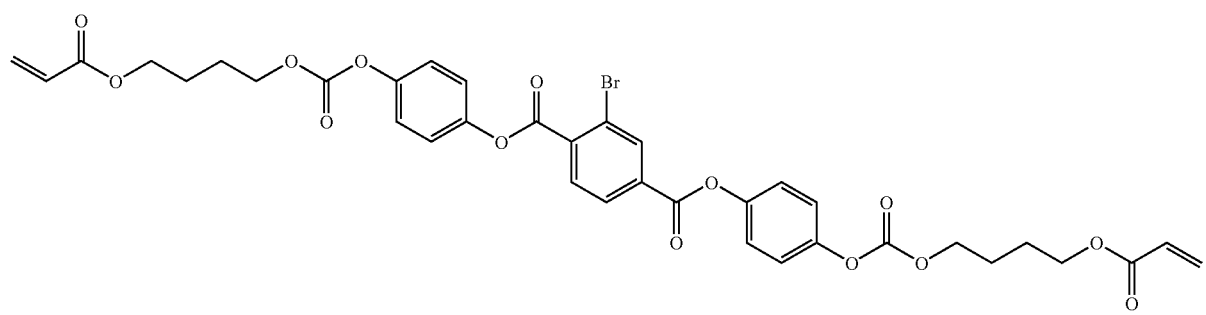

-continued
(I-11)
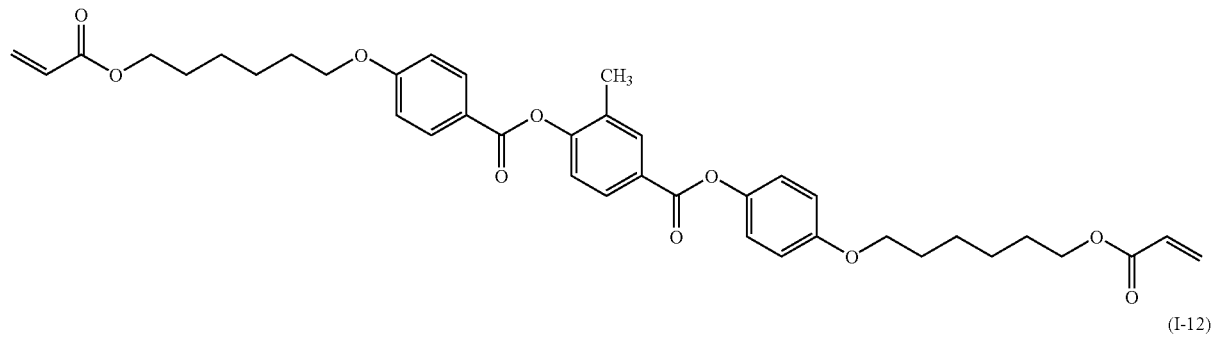
(I-12)
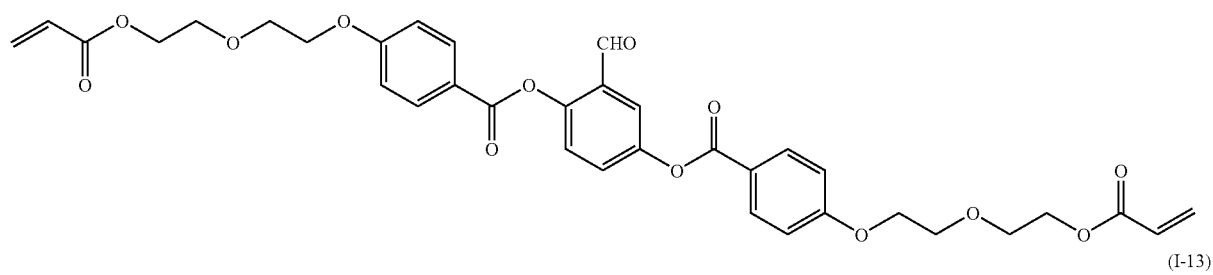
(I-13)
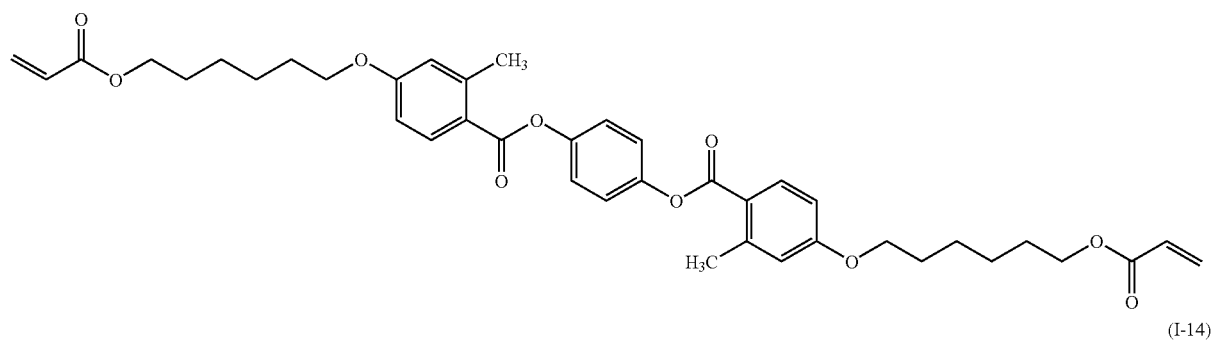
(I-14)
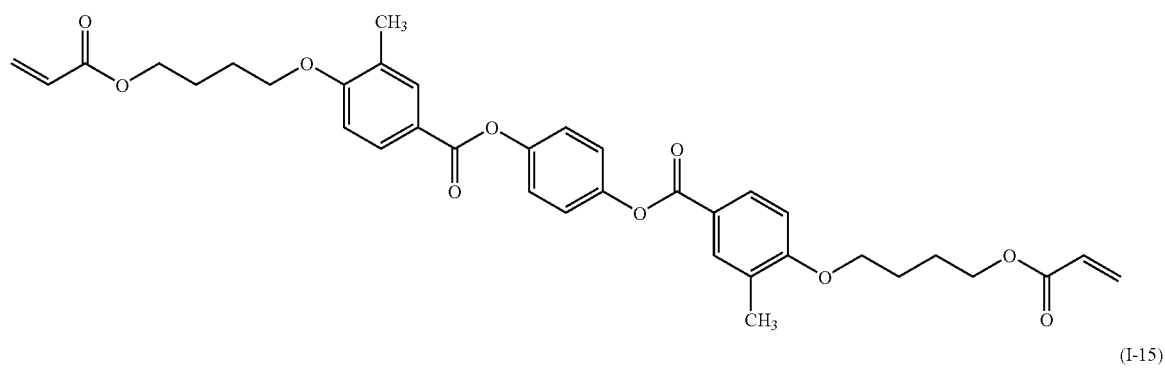
(I-15)
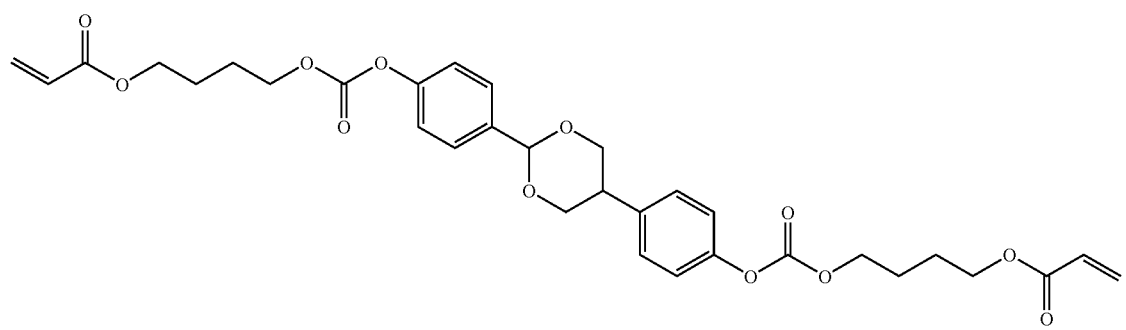

-continued
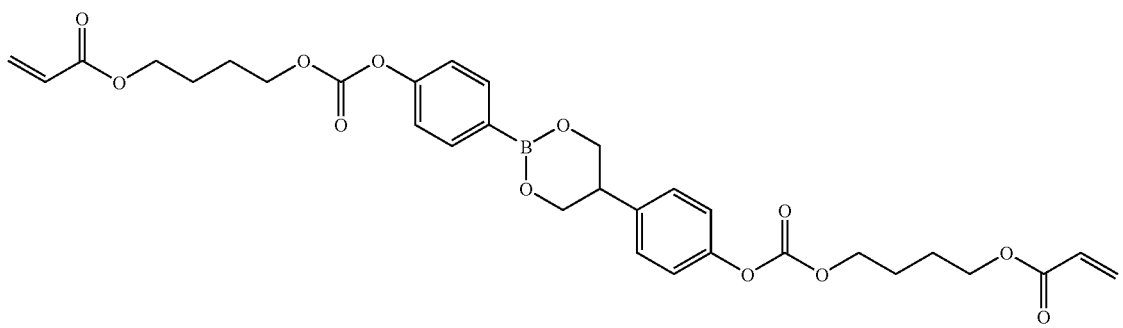
(I-16)
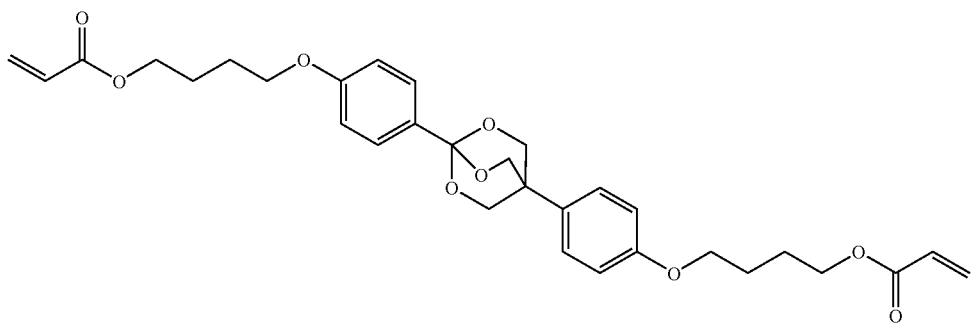
(I-17)
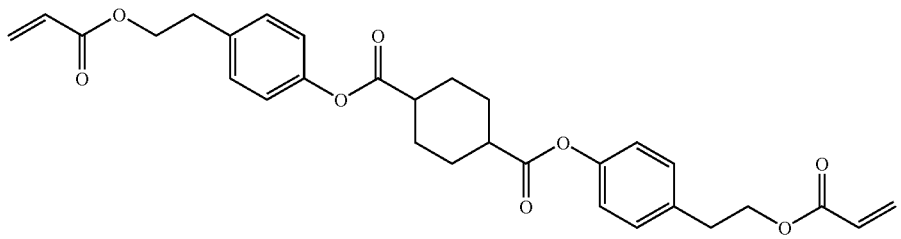
(I-18)
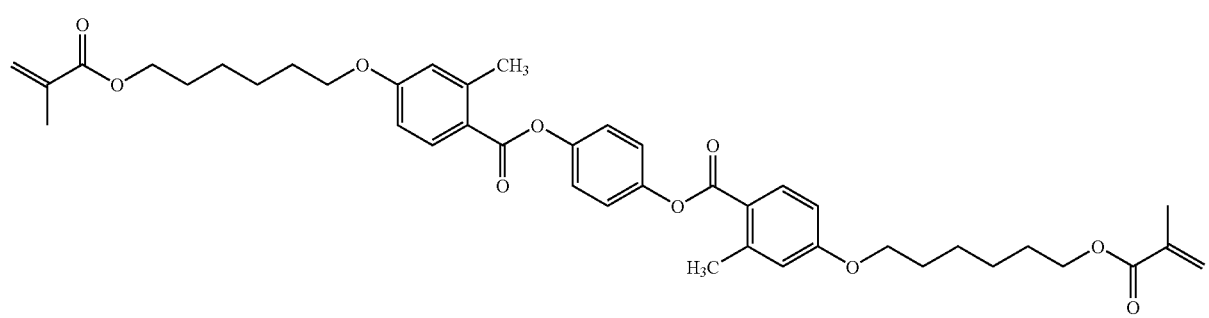
(I-19)
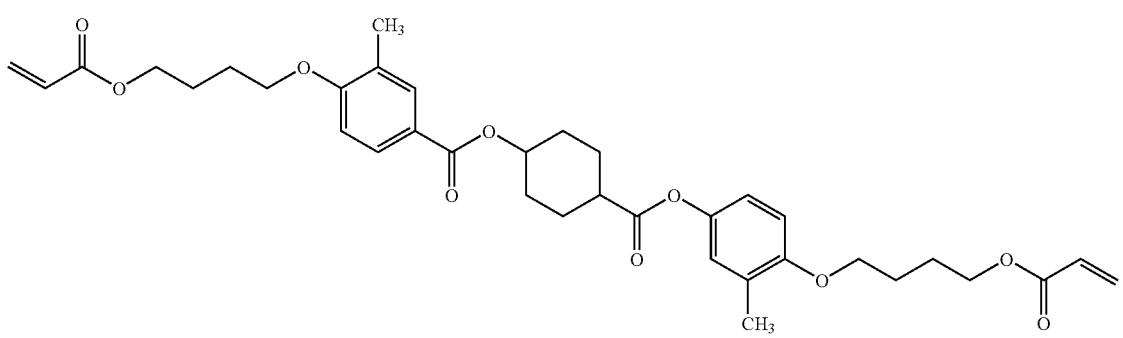
(I-20)

-continued
(I-21)
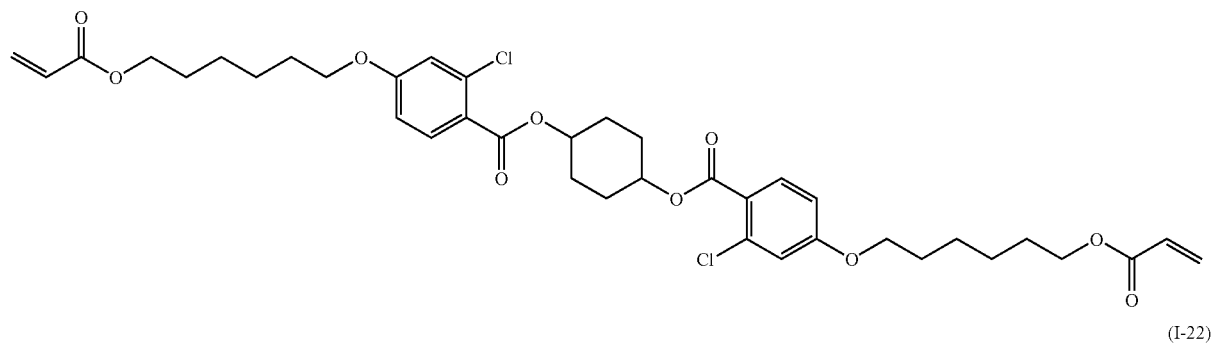
(I-22)
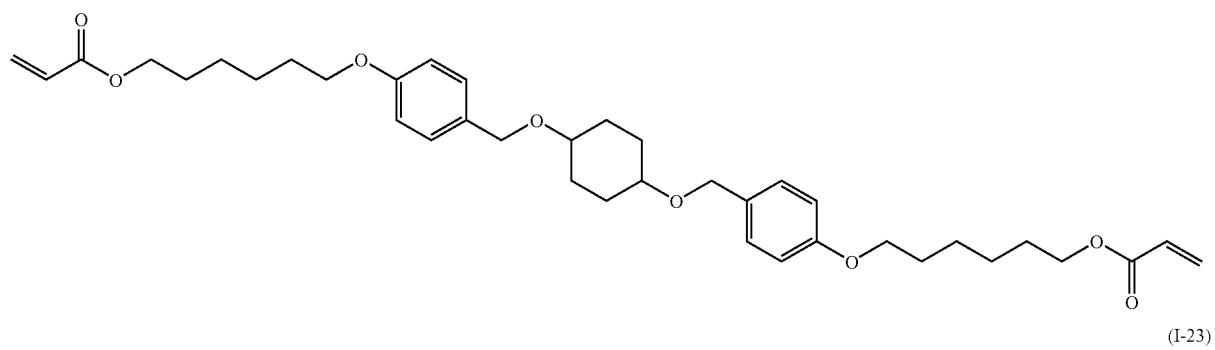
(I-23)
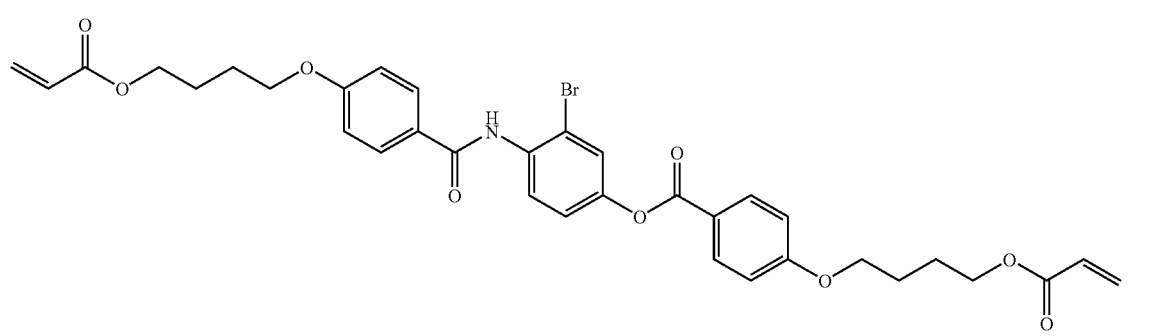
(I-24)
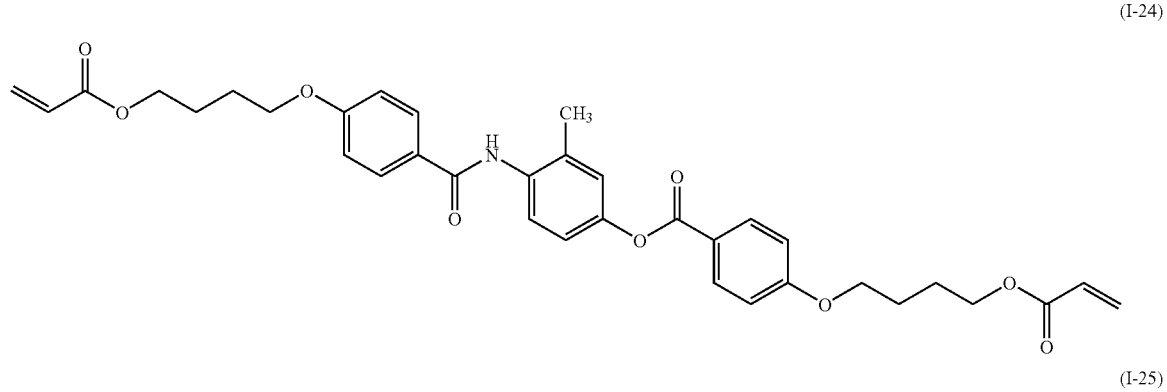
(I-25)
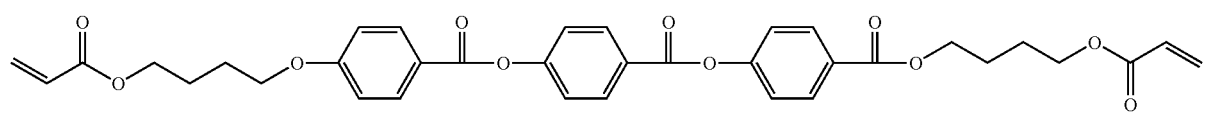

-continued
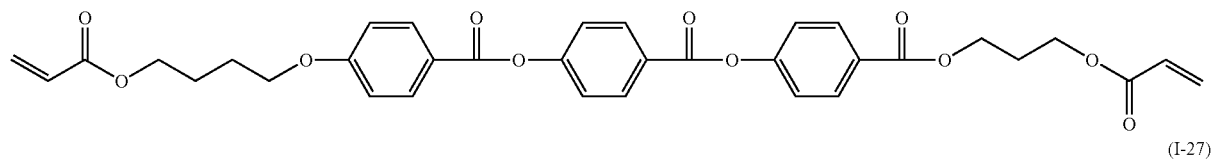
(I-26)
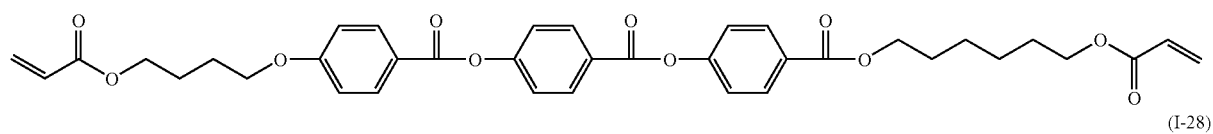
(I-27)
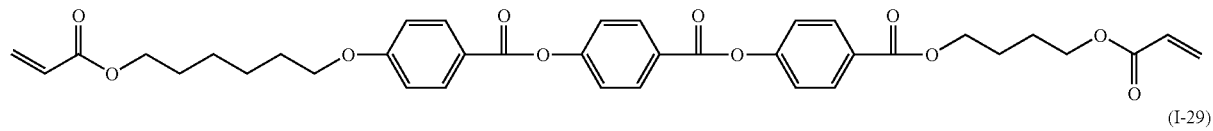
(I-28)
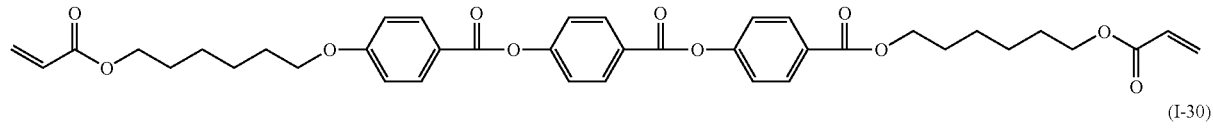
(I-29)
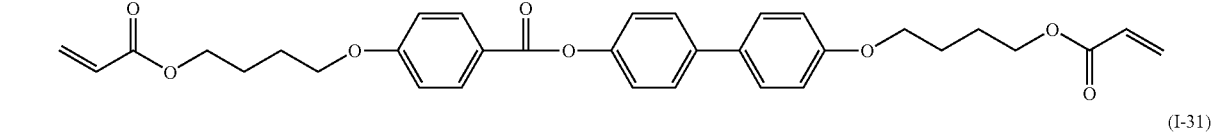
(I-30)
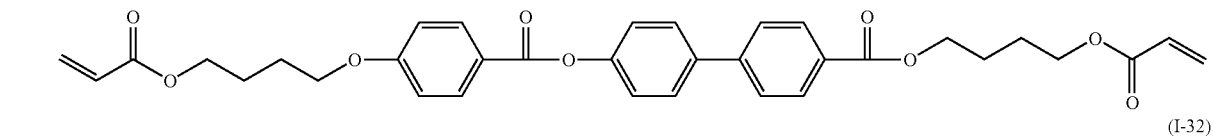
(I-31)
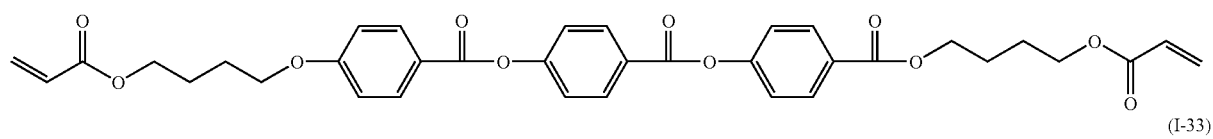
(I-32)
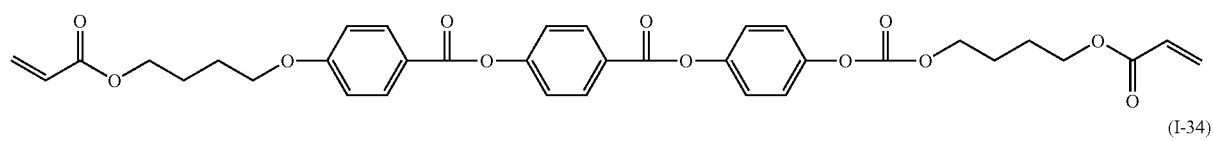
(I-33)
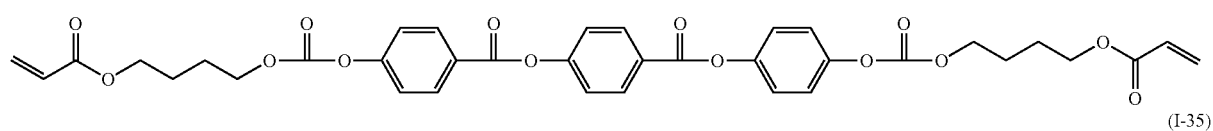
(I-34)
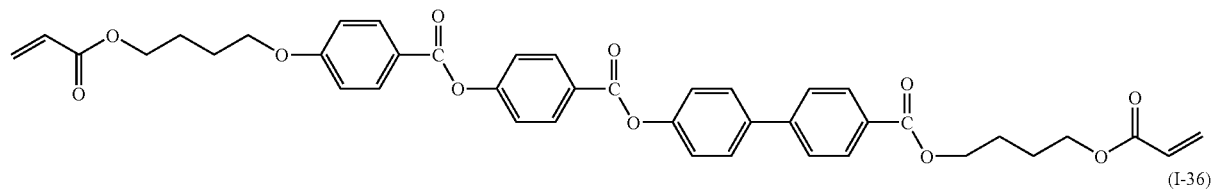
(I-35)
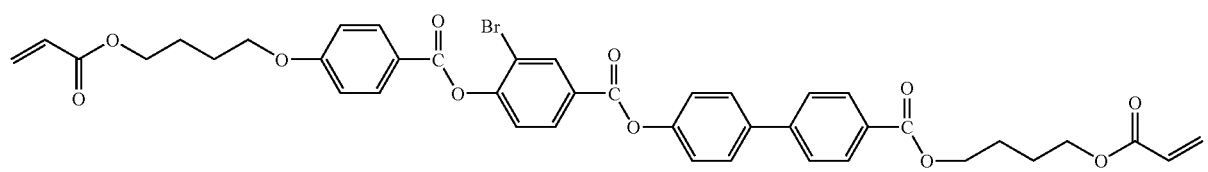
(I-36)

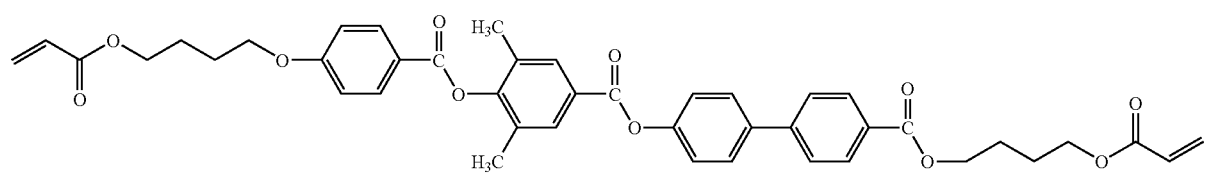
(I-37)
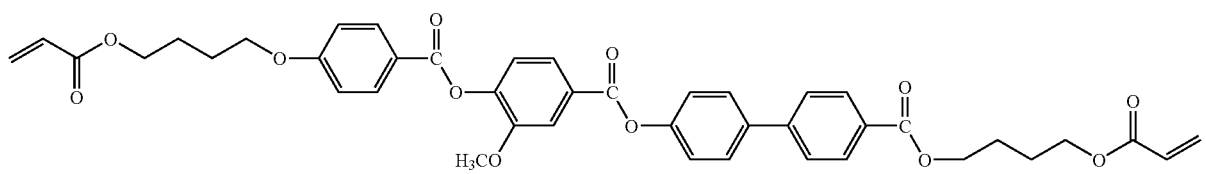
(I-38)
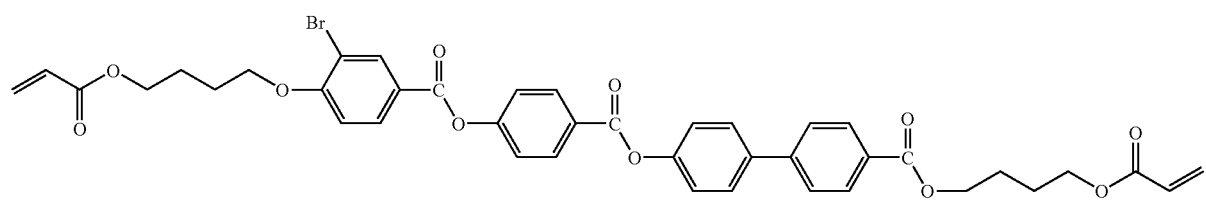
(I-39)
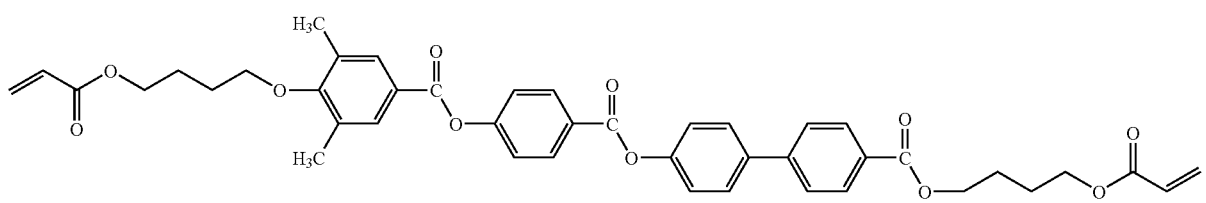
(I-40)
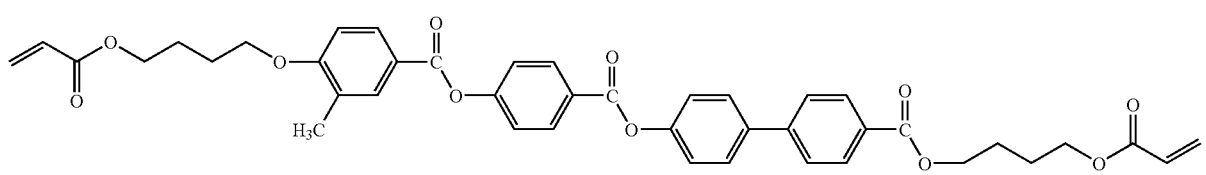
(I-41)
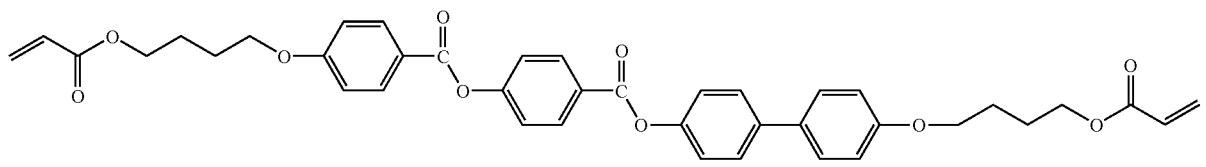
(I-42)
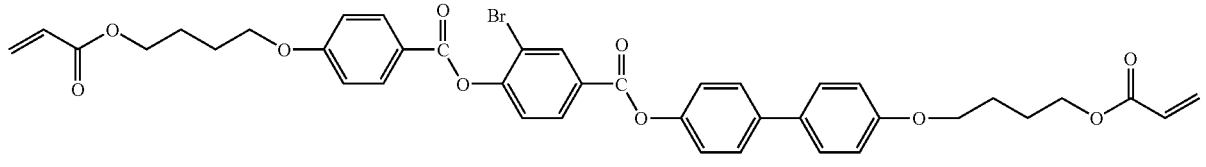
(I-43)

The compound represented by formula (II) (1,3,5-triazine compound) used in the present invention is explained below.

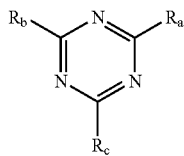

Formula (II)

In formula (II), $R_a$, $R_b$ and $R_c$ each independently represent -$L_1$-$R_1$, -$L_2$-$R_2$ or —NHR. Here, at least one of $R_a$, $R_b$ and $R_c$ is —NHR. $L_1$ and $L_2$ each independently represent a single bond or a divalent linking group. $R_1$ and $R_2$ each independently represent a hydrogen atom or a substituent. R represents a group having a polymerizable group.

In the present invention, it is preferable that two or three of $R_a$, $R_b$ and $R_c$ are —NHR, and more preferable that all of $R_a$, $R_b$ and $R_c$ are —NHR.

In formula (II), $L_1$ and $L_2$ each independently represent a single bond or a divalent linking group. Specific examples of the divalent linking group include a group represented by —$NR_8$— (in which $R_8$ represents a hydrogen atom, an alkyl group which may have a substituent, or an aryl group which may have a substituent, and preferably represents a hydrogen atom), —$SO_2$—, —CO—, a substituted or unsubstituted alkylene group, a substituted or unsubstituted alkenylene group, a substituted or unsubstituted alkynylene group, a substituted or unsubstituted phenylene group, a substituted or unsubstituted biphenylene group, a substituted or unsubstituted naphthalene group, —O—, —S—, —SO—, and a group made by any combination of two or more thereof. More preferably, $L_1$ and $L_2$ are each a single bond, —$NR_8$—, —O—, or —S—, still more preferably a single bond or —$NR_8$—, and most preferably —$NR_8$—.

In formula (II), $R_1$ and $R_2$ each independently represent a hydrogen atom or a substituent. For example, the following atoms and groups can be applied as the substituent.

Specific examples of the substituent that can be applied in the present invention, include a halogen atom (e.g., a fluorine atom, a chlorine atom, a bromine atom, an iodine atom), an alkyl group (preferably a substituted or unsubstituted alkyl group having 1 to 30 carbon atoms, e.g., a methyl group, an ethyl group, a n-propyl group, an isopropyl group, a t-butyl group, a n-octyl group, a 2-ethylhexyl group), a cycloalkyl group (preferably a substituted or unsubstituted cycloalkyl group having 3 to 30 carbon atoms, e.g., a cyclohexyl group, a cyclopentyl group, a 4-n-dodecylcyclohexyl group), a bicycloalkyl group (preferably a substituted or unsubstituted bicycloalkyl group having 5 to 30 carbon atoms, that is, a monovalent group obtained by removing one hydrogen atom from a bicycloalkane having 5 to 30 carbon atoms, e.g., a bicyclo[1,2,2]heptane-2-yl group, a bicyclo[2,2,2]octane-3-yl group), an alkenyl group (preferably a substituted or unsubstituted alkenyl group having 2 to 30 carbon atoms, e.g., a vinyl group, an allyl group), a cycloalkenyl group (preferably a substituted or unsubstituted cycloalkenyl group having 3 to 30 carbon atoms, that is, a monovalent group obtained by removing one hydrogen atom from a cycloalkene having 3 to 30 carbon atoms, e.g., a 2-cyclopentene-1-yl group, a 2-cyclohexene-1-yl group), a bicycloalkenyl group (a substituted or unsubstituted bicycloalkenyl group, preferably a substituted or unsubstituted bicycloalkenyl group having 5 to 30 carbon atoms, that is, a monovalent group obtained by removing one hydrogen atom from a bicycloalkene having one double bond, e.g., a bicyclo[2,2,1]hepto-2-ene-1-yl group, a bicyclo[2,2,2]octo-2-ene-4-yl group), an alkynyl group (preferably a substituted or unsubstituted alkynyl group having 2 to 30 carbon atoms, e.g., an ethynyl group, a propargyl group), an aryl group (preferably a substituted or unsubstituted aryl group having 6 to 30 carbon atoms, e.g., a phenyl group, a p-tolyl group, a naphthyl group), a heterocyclic group (preferably a 5- or 6-membered substituted or unsubstituted heterocyclic group, that is a monovalent group obtained by removing one hydrogen atom from an aromatic or non-aromatic heterocyclic compound, more preferably a 5- or 6-membered aromatic heterocyclic group having 3 to 30 carbon atoms, e.g., a 2-furyl group, a 2-thienyl group, a 2-pyrimidinyl group, a 2-benzothiazolyl group), a cyano group, a hydroxyl group, a nitro group, a carboxyl group, an alkoxy group (preferably a substituted or unsubstituted alkoxy group having 1 to 30 carbon atoms, e.g., a methoxy group, an ethoxy group, an isopropoxy group, a t-butoxy group, a n-octyloxy group, a 2-methoxyethoxy group), an aryloxy group (preferably a substituted or unsubstituted aryloxy group having 6 to 30 carbon atoms, e.g., a phenoxy group, a 2-methylphenoxy group, a 4-tert-butylphenoxy group, a 3-nitrophenoxy group, a 2-tetradecanoylaminophenoxy group), a silyloxy group (preferably a silyloxy group having 3 to 20 carbon atoms, e.g., a trimethylsilyloxy group, a tert-butyldimethylsilyloxy group), a heterocyclic oxy group (preferably a substituted or unsubstituted heterocyclic oxy group having 2 to 30 carbon atoms, e.g., a 1-phenyltetrazole-5-oxy group, a 2-tetrahydropyranyloxy group), an acyloxy group (preferably a formyloxy group, a substituted or unsubstituted alkylcarbonyloxy group having 2 to 30 carbon atoms, or a substituted or unsubstituted arylcarbonyloxy group having 6 to 30 carbon atoms, e.g., a formyloxy group, an acetyloxy group, a pivaloyloxy group, a stearoyloxy group, a benzoyloxy group, a p-methoxyphenylcarbonyloxy group), a carbamoyloxy group (preferably a substituted or unsubstituted carbamoyloxy group having 1 to 30 carbon atoms, e.g., an N,N-dimethylcarbamoyloxy group, an N,N-diethylcarbamoyloxy group, a morpholinocarbonyloxy group, an N,N-di-n-octylaminocarbonyloxy group, an N-n-octylcarbamoyloxy group), an alkoxycarbonyloxy group (preferably a substituted or unsubstituted alkoxycarbonyloxy group having 2 to 30 carbon atoms, e.g., a methoxycarbonyloxy group, an ethoxycarbonyloxy group, a tert-butoxycarbonyloxy group, a n-octylcarbonyloxy group), an aryloxycarbonyloxy group (preferably a substituted or unsubstituted aryloxycarbonyloxy group having 7 to 30 carbon atoms, e.g., a phenoxycarbonyloxy group, a p-methoxyphenoxycarbonyloxy group, a p-n-hexadecyloxyphenoxycarbonyloxy group), an amino group (preferably an amino group, a substituted or unsubstituted alkylamino group having 1 to 30 carbon atoms, or a substituted or unsubstituted anilino group having 6 to 30 carbon atoms, e.g., an amino group, a methylamino group, a dimethylamino group, an anilino group, an N-methyl-anilino group, a diphenylamino group), an acylamino group (preferably a formylamino group, a substituted or unsubstituted alkylcarbonylamino group having 1 to 30 carbon atoms, or a substituted or unsubstituted arylcarbonylamino group having 6 to 30 carbon atoms, e.g., a formylamino group, an acetylamino group, a pivaloylamino group, a lauroylamino group, a benzoylamino group), an aminocarbonylamino group (preferably a substituted or unsubstituted aminocarbonylamino group having 1 to 30 carbon atoms, e.g., a carbamoylamino group, an N,N-dimethylaminocarbonylamino group, an N,N-diethylaminocarbonylamino group, a morpholinocarbonylamino group), an alkoxycarbonylamino group (preferably a substituted or unsubstituted alkoxycarbonylamino group having 2 to 30 carbon atoms, e.g., a methoxycarbonylamino group, an ethoxycarbonylamino group, a tert-butoxycarbonylamino group, a n-octadecyloxycarbonylamino group, an N-methylmethoxycarbonylamino group), an aryloxycarbonylamino group (preferably a substituted or unsubstituted aryloxycarbonylamino group having 7 to 30 carbon atoms, e.g., a phenoxycarbonylamino group, a p-chlorophenoxycarbonylamino group, a m-n-octyloxyphenoxycarbonylamino group), a sulfamoylamino group (preferably a substituted or unsubstituted sulfamoylamino group having 0 (zero) to 30 carbon atoms, e.g., a sulfamoylamino group, an N,N-dimethylaminosulfonylamino group, an N-n-octylaminosulfonylamino group), an alkyl- or aryl-sulfonylamino group (preferably a substituted or unsubstituted alkylsulfonylamino group having 1 to 30 carbon atoms, or a substituted or unsubstituted arylsulfonylamino group having 6 to 30 carbon atoms, e.g., a methylsulfonylamino group, a butylsulfonylamino group, a phenylsulfonylamino group, a 2,3,5-trichlorophenylsulfonylamino group, a p-methylphenylsulfonylamino group), a mercapto group, an alkylthio group (preferably a substituted or unsubstituted alkylthio group having 1 to 30 carbon atoms, e.g., a methylthio group, an ethylthio group, a n-hexadecylthio group), an arylthio group (preferably a substituted or unsubstituted arylthio group having 6 to 30 carbon atoms, e.g., a phenylthio group, a p-chlorophenylthio group, a m-methoxyphenylthio group), a heterocyclic thio group (preferably a substituted or unsubstituted heterocyclic thio group having 2 to 30 carbon atoms, e.g., a 2-benzothiazolylthio group, a 1-phenyltetrazol-5-yl thio group), a sulfamoyl group (preferably a substituted or unsubstituted sulfamoyl group having 0 (zero) to 30 carbon atoms, e.g., an N-ethylsulfamoyl group, an N-(3-dodecyloxypropyl) sulfamoyl group, an N,N-dimethylsulfamoyl group, an N-acetylsulfamoyl group, an N-benzoylsulfamoyl group, an N—(N'-phenylcarbamoyl)sulfamoyl group), a sulfo group, an alkyl- or aryl-sulfinyl group (preferably a substituted or unsubstituted alkylsulfinyl group having 1 to 30 carbon atoms, or a substituted or unsubstituted arylsulfinyl group having 6 to 30 carbon atoms, e.g., a methylsulfinyl group, an ethylsulfinyl group, a phenylsulfinyl group, a p-methylphenylsulfinyl group), an alkyl- or aryl-sulfonyl group (preferably a substituted or unsubstituted alkylsulfonyl group having 1 to 30 carbon atoms, or a substituted or unsubstituted arylsulfonyl group having 6 to 30 carbon atoms, e.g., a methylsulfonyl group, an ethylsulfonyl group, a phenylsulfonyl group, a p-methylphenylsulfonyl group), an acyl group (preferably a formyl group, a substituted or unsubstituted alkylcarbonyl group having 2 to 30 carbon atoms, or a substituted or unsubstituted arylcarbonyl group having 7 to 30 carbon atoms, e.g., an acetyl group, a pivaloylbenzoyl group), an aryloxycarbonyl group (preferably a substituted or unsubstituted aryloxycarbonyl group having 7 to 30 carbon atoms, e.g., a phenoxycarbonyl group, an o-chlorophenoxycarbonyl group, a m-nitrophenoxycarbonyl group, a p-tert-butylphenoxycarbonyl group), an alkoxycarbonyl group (preferably a substituted or unsubstituted alkoxycarbonyl group having 2 to 30 carbon atoms, e.g., a methoxycarbonyl group, an ethoxycarbonyl group, a tert-butoxycarbonyl group, a n-octadecyloxycarbonyl group), a carbamoyl group (preferably a substituted or unsubstituted carbamoyl group having 1 to 30 carbon atoms, e.g., a carbamoyl group, an N-methylcarbamoyl group, an N,N-dimethylcarbamoyl group, an N,N-di-n-octylcarbamoyl group, an N-(methylsulfonyl)carbamoyl group), an aryl- or heterocyclic-azo group (preferably a substituted or unsubstituted arylazo group having 6 to 30 carbon atoms, or a substituted or unsubstituted heterocyclic azo group having 3 to 30 carbon atoms, e.g., a phenylazo group, a p-chlorophenylazo group, a 5-ethylthio-1,3,4-thiadiazole-2-yl azo group), an imido group (preferably an N-succinimido group, an N-phthalimido group), a phosphino group (preferably a substituted or unsubstituted phosphino group having 2 to 30 carbon atoms, e.g., a dimethylphosphino group, a diphenylphosphino group, a methylphenoxyphosphino group), a phosphinyl group (preferably a substituted or unsubstituted phosphinyl group having 2 to 30 carbon atoms, e.g., a phosphinyl group, a dioctyloxyphosphinyl group, a diethoxyphosphinyl group), a phosphinyloxy group (preferably a substituted or unsubstituted phosphinyloxy group having 2 to 30 carbon atoms, e.g., a diphenoxyphosphinyloxy group, a dioctyloxyphosphinyloxy group), a phosphinylamino group (preferably a substituted or unsubstituted phosphinylamino group having 2 to 30 carbon atoms, e.g., a dimethoxyphosphinylamino group, a dimethylaminophosphinylamino group), and a silyl group (preferably a substituted or unsubstituted silyl group having 3 to 30 carbon atoms, e.g., a trimethylsilyl group, a tert-butyldimethylsilyl group, a phenyldimethylsilyl group).

Of the above-mentioned substituents, those having a hydrogen atom(s) may be further substituted with any of the above groups in place of the hydrogen atom(s). Examples of such a functional group include an alkylcarbonylaminosulfonyl group, an arylcarbonylaminosulfonyl group, an alkylsulfonylaminocarbonyl group, and an arylsulfonylaminocarbonyl group. Specific examples thereof include a methylsulfonylaminocarbonyl group, a p-methylphenylsulfonylaminocarbonyl group, an acetylaminosulfonyl group, and a benzoylaminosulfonyl group.

$R_1$ and $R_2$ each are preferably a chlorine atom, an alkyl group, an alkenyl group, an aryl group, a heterocyclic group, a hydroxyl group, a carboxyl group, an alkoxy group, an aryloxy group, an acyloxy group, or an amino group; and more preferably a chlorine atom, an alkyl group, an aryl group, a hydroxyl group, or an amino group.

In formula (II), R represents a group having a polymerizable group.

The polymerizable group which R has, is preferably a group that is able to undergo an addition polymerization reaction or a condensation polymerization reaction. Such a polymerizable group is preferably a polymerizable ethylenically unsaturated group or a ring-opening polymerizable group.

The compound represented by formula (II) is preferably a polymerizable compound represented by formula (III).

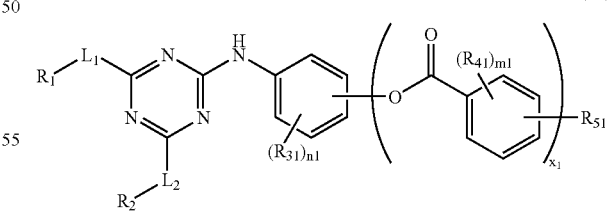

Formula (III)

In formula (III), $L_1$ and $L_2$, which may be the same or different from each other, each independently represent a single bond or a divalent linking group; $R_1$ and $R_2$ each independently represent a hydrogen atom or a substituent; $R_{31}$ and $R_{41}$, which may be the same or different from each other, each independently represent a substituent; n1 represents an integer of 0 (zero) to 4; when n1 is 2 or more, $R_{31}$'s may be the same or different from each other, or $R_{31}$'s may form a ring, if possible; m1 represents an integer of 0 (zero) to 4; when m1 is 2 or more, $R_{41}$'s may be the same or different from each other, or $R_{41}$'s may form a ring, if possible; $X_1$ represents an integer of 0 (zero) to 5; when $X_1$ is 2 or more, $(R_{41})_{m1}$'s may be the same or different from each other; and $R_{51}$, represents an alkoxy group, an alkoxycarbonyl group, or an alkoxycarbonyloxy group, each of which has a group represented by P1, P2 or P3, in which an alkoxy moiety of the group represented by $R_{51}$ may have an ether bond therein:

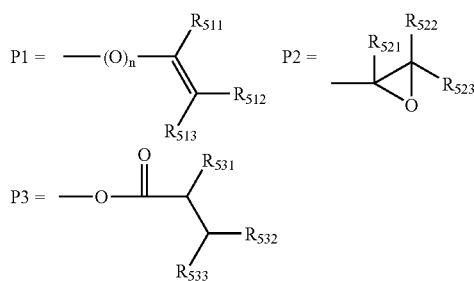

wherein $R_{511}$, $R_{512}$, $R_{513}$, $R_{521}$, $R_{522}$, $R_{523}$, $R_{531}$, $R_{532}$ and $R_{533}$ each independently represent a hydrogen atom or an alkyl group; and n represents 0 (zero) or 1.

In formula (III), $L_1$ and $L_2$ have the same meanings as those in the formula (II), and the preferable ranges thereof are also the same as those in the formula (II).

In formula (III), $R_1$ and $R_2$ have the same meanings as those in the formula (II), and the preferable ranges thereof are also the same as those in the formula (II).

In formula (III), $R_{31}$ and $R_{41}$ each independently represent a substituent. Examples of the substituent include those given as examples of the substituent represented by $R_1$ or $R_2$ in the formula (II).

$R_{31}$ is preferably a halogen atom, an alkyl group, a cyano group, a hydroxyl group, an alkoxy group, an aryloxy group, an acyloxy group, an alkoxycarbonyloxy group, an amino group, or an acylamino group; and more preferably a halogen atom, an alkyl group, a cyano group, a hydroxyl group, an alkoxy group, an acyloxy group, an alkoxycarbonyl group, or an alkoxycarbonyloxy group.

$R_{41}$ is preferably a halogen atom, an alkyl group, an alkenyl group, an alkynyl group, a cyano group, a hydroxyl group, a nitro group, a carboxyl group, an alkoxy group, an aryloxy group, an acyloxy group, a carbamoyloxy group, an alkoxycarbonyloxy group, an aryloxycarbonyloxy group, an amino group, an acylamino group, an alkoxycarbonylamino group, an aryloxycarbonylamino group, a sulfamoylamino group, an alkyl- or aryl-sulfonylamino group, a mercapto group, an alkylthio group, an arylthio group, or a sulfamoyl group; and more preferably a halogen atom, an alkyl group, a cyano group, a hydroxyl group, an alkoxy group, an acyloxy group, an alkoxycarbonyl group, or an alkoxycarbonyloxy group.

In formula (III), n1 represents an integer of 0 to 4. When n1 is 2 or more, $R_{31}$'s may be the same or different from each other, or $R_{31}$'s may, if possible, bond together to form a ring. n1 is preferably an integer of 0 to 2.

In formula (III), m1 represents an integer of 0 to 4. When m1 is 2 or more, $R_{41}$'s may be the same or different from each other, or $R_{41}$'s may, if possible, bond together to form a ring. m1 is preferably an integer of 0 to 3.

In formula (III), $X_1$ represents an integer of 0 to 5. When $X_1$ is 2 or more, $(R_{41})_{m1}$'s may be the same or different from each other. $X_1$ is preferably an integer of 0 to 3, and more preferably 0, 1, or 2.

When $X_1$ is not 0, the substituted benzoyloxy group that is a group on the aminophenyl group, is preferably in the meta- or para-position relative to the amino group, most preferably in the para-position.

In formula (III), $R_{51}$, represents an alkoxy group, an alkoxycarbonyl group, or an alkoxycarbonyloxy group, each of which has P1, P2 or P3 as a substituent thereon, in which an alkoxy moiety of the group represented by $R_{51}$ may have an ether bond(s) in an alkylene moiety which constitutes the alkoxy moiety.

When $X_1$ is 0, the $R_{51}$, that is a group on the aminophenyl group, is preferably in the meta- or para-position relative to the amino group on the benzene ring. When $X_1$ is not 0, the $R_{51}$ that is a group on the benzoyloxy group, is preferably in the meta- or para-position relative to the carbonyl group on the benzene ring.

In the group represented by P1, $R_{511}$, $R_{512}$ and $R_{513}$ each independently represent a hydrogen atom or an alkyl group.

The group to give the alkoxy, alkoxycarbonyl or alkoxycarbonyloxy group whose terminal is substituent with the group P1, represents an alkyleneoxy group (e.g. an alkyleneoxy group, such as ethyleneoxy, propyleneoxy, butyleneoxy, pentyleneoxy, hexyleneoxy, and heptyleneoxy; and an ether bond-containing substituted alkyleneoxy group, such as ethyleneoxyethoxy), an alkyleneoxycarbonyloxy group (e.g. an alkyleneoxycarbonyloxy group, such as ethyleneoxycarbonyloxy, propyleneoxycarbonyloxy, butyleneoxycarbonyloxy, pentyleneoxycarbonyloxy, hexyleneoxycarbonyloxy, and heptyleneoxycarbonyloxy; and an ether bond-containing substituted alkyleneoxycarbonyloxy group, such as ethyleneoxyethoxycarbonyloxy), or an alkyleneoxycarbonyl group (e.g. an alkyleneoxycarbonyl group, such as ethyleneoxycarbonyl group, propyleneoxycarbonyl group, butyleneoxycarbonyl group, pentyleneoxycarbonyl group, hexyleneoxycarbonyl group, and heptyleneoxycarbonyl group; or an ether bond-containing substituted alkyleneoxycarbonyl group, such as ethyleneoxyethoxycarbonyl group). The terminal substituent P1 may be directly bonded to an aromatic ring. The same is applied to the cases where the terminal substituent is P2 or P3.

n represents an integer of 0 to 1, preferably n is 1. Where n is 1, the terminal substituent P1 of $R_{51}$ represents a substituted or unsubstituted vinyl ether group. The groups $R_{511}$ and $R_{513}$ of the group P1 each independently represent a hydrogen atom, or an alkyl group (e.g. methyl, ethyl, n-propyl, isopropyl, n-butyl, pentyl, hexyl, heptyl, octyl, and nonyl; and preferably a lower alkyl group, such as methyl and ethyl, more preferably methyl). Preferable examples of combination include those in which $R_{511}$ represents a methyl group and $R_{513}$ represents a hydrogen atom, or $R_{511}$ and $R_{513}$ each represent a hydrogen atom.

The group $R_{512}$ represents a hydrogen atom, or a substituted or unsubstituted alkyl group (e.g. methyl, ethyl, n-propyl, isopropyl, n-butyl, pentyl, hexyl, heptyl, octyl, nonyl, 2-chloroethyl, 3-methoxyethyl, and methoxyethoxyethyl; and preferably a lower alkyl group, such as methyl and ethyl, more preferably methyl). The group $R_{512}$ is preferably a hydrogen atom or a lower alkyl group, more preferably a hydrogen atom. Therefore, it is preferable to use, as the group P1, an unsubstituted vinyloxy group, which is a functional group high in polymerization activity in general.

The terminal substituent P2 of $R_{51}$, represents a substituted or unsubstituted oxirane group. The groups $R_{521}$ and $R_{522}$ of the group P2 each independently represent a hydrogen atom, or an alkyl group (e.g. methyl, ethyl, n-propyl, isopropyl, n-butyl, pentyl, hexyl, heptyl, octyl, and nonyl; and preferably a lower alkyl group, such as methyl and ethyl, more preferably methyl). It is preferable that $R_{521}$ and $R_{522}$ each are a hydrogen atom.

The group $R_{523}$ represents a hydrogen atom, or a substituted or unsubstituted alkyl group (e.g. methyl, ethyl, n-propyl, isopropyl, n-butyl, pentyl, hexyl, heptyl, octyl, nonyl, 2-chloroethyl, 3-methoxyethyl, and methoxyethoxyethyl; and preferably a lower alkyl group, such as methyl and ethyl, more preferably methyl). The group $R_{523}$ is preferably a hydrogen atom, or a lower alkyl group, such as methyl, ethyl, or n-propyl.

The terminal substituent P3 of $R_{51}$, represents a substituted or unsubstituted acryl group (acryloyloxy group). The groups $R_{531}$ and $R_{533}$ of the group P3 each independently represent a hydrogen atom, or an alkyl group (e.g. methyl, ethyl, n-propyl, isopropyl, n-butyl, pentyl, hexyl, heptyl, octyl, and nonyl; and preferably a lower alkyl group, such as methyl and ethyl, more preferably methyl). Preferable examples of combination include those in which $R_{531}$ represents a methyl group and $R_{533}$ represents a hydrogen atom, or $R_{531}$ and $R_{533}$ each represent a hydrogen atom.

The group $R_{532}$ represents a hydrogen atom, or a substituted or unsubstituted alkyl group (e.g. methyl, ethyl, n-propyl, isopropyl, n-butyl, pentyl, hexyl, heptyl, octyl, nonyl, 2-chloroethyl, 3-methoxyethyl, and methoxyethoxyethyl; and preferably a lower alkyl group, such as methyl and ethyl, more preferably methyl). The group $R_{532}$ is preferably a hydrogen atom. Therefore, it is preferable to use, as the group P3, a functional group high in polymerization activity in general, such as an unsubstituted acryloxy group, a methacryloxy group, or a crotonyloxy group.

The compound represented by formula (II) is also preferably a polymerizable compound represented by formula (IV):

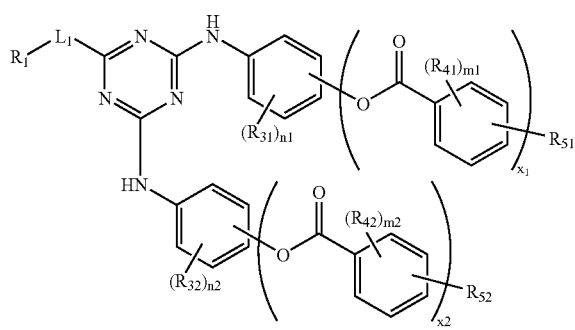

Formula (IV)

wherein $L_1$ represents a single bond or a divalent linking group; $R_1$ represents a hydrogen atom or a substituent; $R_{31}$, $R_{32}$, $R_{41}$ and $R_{42}$, which may be the same or different from each other, each represent a substituent; n1 and n2 each independently represent an integer of 0 (zero) to 4; when n1 is 2 or more, $R_{31}$'s may be the same or different from each other, or $R_{31}$'s may form a ring, if possible; when n2 is 2 or more, $R_{32}$'s may be the same or different from each other, or $R_{32}$'s may form a ring, if possible; m1 and m2 each independently represent an integer of 0 (zero) to 4; when m1 is 2 or more, $R_{41}$'s may be the same or different from each other, or $R_{41}$'s may form a ring, if possible; when m2 is 2 or more, $R_{42}$'s may be the same or different from each other, or $R_{42}$'s may form a ring, if possible; $X_1$ and $X_2$ each independently represent an integer of 0 (zero) to 5; when $X_1$ is 2 or more, $(R_{41})_{m1}$'s may be the same or different from each other; when $X_2$ is 2 or more, $(R_{42})_{m2}$'s may be the same or different from each other; and $R_{51}$ and $R_{52}$ each independently represent an alkoxy group, an alkoxycarbonyl group, or an alkoxycarbonyloxy group, each of which has a group represented by the aforementioned P1, P2 or P3, in which an alkoxy moiety of the group represented by $R_{51}$ or $R_{52}$ may have an ether bond therein.

In formula (IV), $L_1$, $R_1$, $R_{31}$, $R_{41}$, $R_{51}$, n1, m1, $X_1$, P1, P2 and P3 have the same meanings as those in the formula (I), and the preferable ranges thereof are also the same as those in the formula (I).

In formula (IV), $R_{32}$ represents a substituent. Examples of the substituent represented by $R_{32}$ include those given as examples of the substituent represented by $R_{31}$, and the preferable ranges thereof are also the same as those of $R_{31}$.

In formula (IV), $R_{42}$ represents a substituent. Examples of the substituent represented by $R_{42}$ include those given as examples of the substituent represented by $R_{41}$, and the preferable ranges thereof are also the same as those of $R_{41}$.

In formula (IV), n2 represents an integer of 0 to 4. When n2 is 2 or more, $R_{32}$'s may be the same or different from each other, or $R_{32}$'s may, if possible, bond together to form a ring. n2 is preferably an integer of 0 to 2.

In formula (IV), m2 represents an integer of 0 to 4. When m2 is 2 or more, $R_{42}$'s may be the same or different from each other, or $R_{42}$'s may, if possible, bond together to form a ring. m2 is preferably an integer of 0 to 3.

In formula (IV), $X_2$ represents an integer of 0 to 5. When $X_2$ is 2 or more, $(R_{42})_{m2}$'s may be the same or different from each other. $X_2$ is preferably an integer of 0 to 3, and more preferably 0, 1, or 2.

When $X_2$ is not 0, the substituted benzoyloxy group that is a group on the aminophenyl group, is preferably in the meta- or para-position relative to the amino group, most preferably in the para-position.

In formula (IV), $R_{52}$ represents an alkoxy group, an alkoxycarbonyl group, or an alkoxycarbonyloxy group, each of which has P1, P2 or P3, as a substituent thereon, in which an alkoxy moiety of the group represented by $R_{52}$ may have an ether bond(s) in an alkylene moiety which constitutes the alkoxy moiety.

When $X_2$ is 0, the $R_{52}$ that is a group on the aminophenyl group, is preferably in the meta- or para-position relative to the amino group on the benzene ring. When $X_2$ is not 0, the $R_{52}$ that is a group on the benzoyloxy group, is preferably in the meta- or para-position relative to the carbonyl group on the benzene ring.

$R_{52}$ and $R_{51}$ may be the same or different from each other, preferably they are the same.

The compound represented by formula (II) is more preferably a polymerizable compound represented by formula (V):

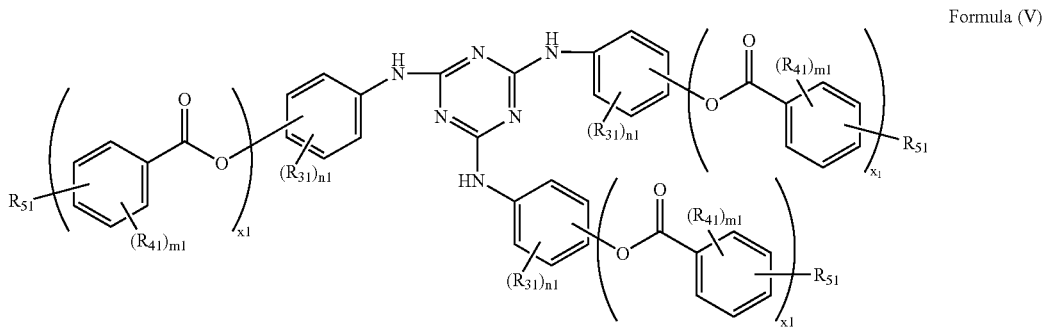

Formula (V)

wherein $R_{31}$ and $R_{41}$, which may be the same or different from each other, each represent a substituent; n1 represents an integer of 0 (zero) to 4; when n1 is 2 or more, $R_{31}$'s on a single benzene ring may be the same or different from each other, or may form a ring, if possible; m1 represents an integer of 0 (zero) to 4; when m1 is 2 or more, $R_{41}$'s on a single benzene ring may be the same or different from each other, or may form a ring, if possible; $X_1$ represents an integer of 0 (zero) to 5; when $X_1$ is 2 or more, a series of $(R_{41})_{m1}$'s may be the same or different from each other; and $R_{51}$ represents an alkoxy group, an alkoxycarbonyl group, or an alkoxycarbonyloxy group, each of which has a group represented by the aforementioned P1, P2 or P3, in which an alkoxy moiety of the group represented by $R_{51}$, may have an ether bond therein.

In formula (III), $R_{31}$, $R_{41}$, $R_{51}$, n1, m1, $X_1$, $X_2$, P1, P2 and P3 have the same meanings as those in the formula (I), and the preferable ranges thereof are also the same as those in the formula (I).

Specific examples of the polymerizable compound for use in the present invention as represented by formula (II), (III), (IV), or (V) are shown below, but the present invention is not meant to be limited to those. In the following description, when the exemplified compounds shown below are referred to, the number "X" put in parentheses, that is, "(X)" attached to the exemplified compound, is utilized to express the compound as "Exemplified compound (X)", unless otherwise specified:

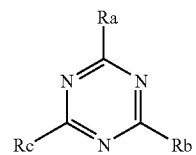

wherein Ra, Rb and Rc each represent the group, as shown in Table 1 below.

TABLE I

| Exemplified compound | Ra | Rb | Rc |
|---|---|---|---|
| (1) | T-1 | T-1 | T-1 |
| (2) | T-2 | T-2 | T-2 |
| (3) | T-3 | T-3 | T-3 |
| (4) | T-4 | T-4 | T-4 |
| (5) | T-5 | T-5 | T-5 |
| (6) | T-6 | T-6 | T-6 |
| (7) | T-7 | T-7 | T-7 |
| (8) | T-8 | T-8 | T-8 |
| (9) | T-9 | T-9 | T-9 |
| (10) | T-10 | T-10 | T-10 |
| (11) | T-11 | T-11 | T-11 |
| (12) | T-12 | T-12 | T-12 |
| (13) | T-13 | T-13 | T-13 |
| (14) | T-14 | T-14 | T-14 |
| (15) | T-15 | T-15 | T-15 |
| (16) | T-15 | T-15 | T-43 |
| (17) | T-15 | T-15 | T-50 |
| (18) | T-16 | T-16 | T-16 |
| (19) | T-17 | T-17 | T-17 |
| (20) | T-18 | T-18 | T-18 |
| (21) | T-18 | T-18 | T-43 |
| (22) | T-18 | T-18 | T-44 |
| (23) | T-18 | T-18 | T-45 |
| (24) | T-18 | T-18 | T-46 |
| (25) | T-18 | T-18 | T-47 |
| (26) | T-18 | T-18 | T-48 |
| (27) | T-18 | T-18 | T-49 |
| (28) | T-18 | T-18 | T-50 |
| (29) | T-18 | T-18 | T-29 |
| (30) | T-18 | T-18 | T-30 |

TABLE I-continued
| Exemplified compound | Ra | Rb | Rc |
|---|---|---|---|
| (31) | T-18 | T-18 | T-3 |
| (32) | T-19 | T-19 | T-19 |
| (33) | T-20 | T-20 | T-20 |
| (34) | T-21 | T-21 | T-21 |
| (35) | T-22 | T-22 | T-22 |
| (36) | T-23 | T-23 | T-23 |
| (37) | T-24 | T-24 | T-24 |
| (38) | T-25 | T-25 | T-25 |
| (39) | T-26 | T-26 | T-26 |
| (40) | T-27 | T-27 | T-27 |
| (41) | T-27 | T-27 | T-46 |
| (42) | T-27 | T-27 | T-47 |
| (43) | T-27 | T-46 | T-46 |
| (44) | T-28 | T-28 | T-28 |
| (45) | T-29 | T-29 | T-29 |
| (46) | T-30 | T-30 | T-30 |
| (47) | T-31 | T-31 | T-31 |
| (48) | T-32 | T-32 | T-32 |
| (49) | T-33 | T-33 | T-33 |
| (50) | T-34 | T-34 | T-34 |
| (51) | T-35 | T-35 | T-35 |
| (52) | T-36 | T-36 | T-36 |
| (53) | T-37 | T-37 | T-37 |
| (54) | T-38 | T-38 | T-38 |
| (55) | T-39 | T-39 | T-39 |
| (56) | T-40 | T-40 | T-40 |
| (57) | T-41 | T-41 | T-41 |
| (58) | T-42 | T-42 | T-42 |
(T-1)
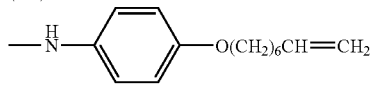
(T-2)
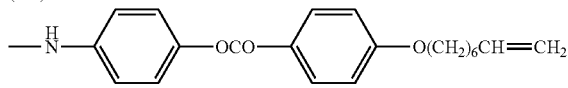
(T-3)
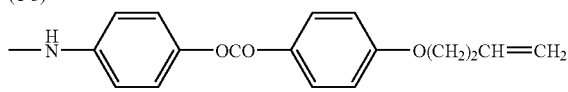
(T-4)
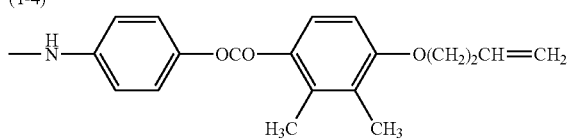
(T-5)
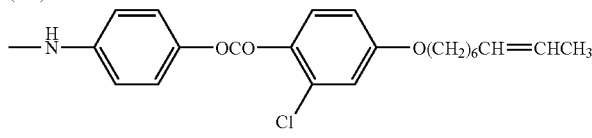
(T-6)
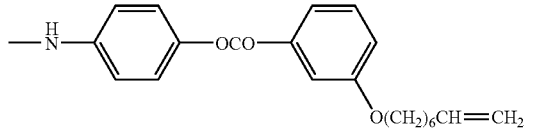
(T-7)
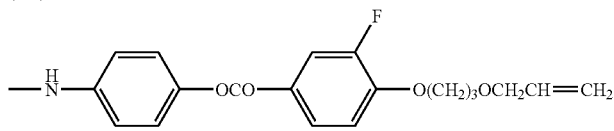

TABLE I-continued

| Exemplified compound | Ra | Rb | Rc |
|---|---|---|---|

(T-8) —NH—C6H4—OCO—C6H3(COO(CH2)8CH=CH2)—

(T-9) —NH—C6H4—OCO—C6H2(CH3)(CH3)—(CH2)7OCH=CH2

(T-10) —NH—C6H4—OCO—C6H4—O(C2H4O)2CH2CH=CH2

(T-11) —NH—C6H4—OCO—C6H3(CH3)—O(CH2)6OCH=CH2

(T-12) —NH—C6H4—OCO—C6H4—O(CH2)5OCH=CHC2H5

(T-13) —NH—C6H4—OCO—C6H3(CH3)—O(C2H4O)2OCH=CH2

(T-14) —NH—C6H4—OCO—C6H4—OCO—C6H4—O(CH2)4CH=CH2

(T-15) —HN—C6H4—O(CH2)6OCOCH=CH2

(T-16) —HN—C6H4—OCOO(CH2)4OCOCH=CH2

(T-17) —HN—C6H4—COO(CH2)4OCOCH=CH2

(T-18) —NH—C6H4—OCO—C6H4—O(CH2)4OCOCH=CH2

(T-19) —NH—C6H4—OCO—C6H3(CH3)—O(CH2)5OCOCH=CHCH3

TABLE I-continued

| Exemplified compound | Ra | Rb | Rc |
|---|---|---|---|

(T-20) [chemical structure: —NH—C6H4—OCO—C6H4(3-O(CH2)4OCOCH=CH2)]

(T-21) [chemical structure: —NH—C6H4—OCO—C6H2(2,3-diCH3)(4-O(CH2)7OCOCH=CH2)]

(T-22) [chemical structure: —NH—C6H4—OCO—C6H4(3-COO(CH2)4OCOCH=CH2)]

(T-23) [chemical structure: —NH—C6H4—OCO—C6H4—O(CH2)6OCOC(CH3)=C(CH3)2]

(T-24) [chemical structure: —NH—C6H4—OCO—C6H3(2-CH3)(4-O(CH2)4OCOCH=CHCH3)]

(T-25) [chemical structure: —NH—C6H4—OCO—C6H4—OCO—C6H3(Br)—O(CH2)4OCOCH=CH2]

(T-26) [chemical structure: —NH—C6H4—OCO—C6H3(NC)—O(CH2)4OCOCH=C(CH3)2]

(T-27) [chemical structure: —NH—C6H4—OCO—C6H4—OCO—C6H4—O(CH2)4OCOCH=CH2]

(T-28) [chemical structure: —NH—C6H4—OCO—C6H3(2-O(CH2)4OCOCH=CH2)(4-O(CH2)4OCOCH=CH2)]

(T-29) [chemical structure: —NH—C6H4—O(CH2)5CH(epoxide)CH2]

(T-30) [chemical structure: —NH—C6H4—OCO—C6H4—O(CH2)4CH(epoxide)CH2]

(T-31) [chemical structure: —NH—C6H4—OCO—C6H4—O(CH2)5CH(epoxide)CH2]

TABLE I-continued

| Exemplified compound | Ra | Rb | Rc |
|---|---|---|---|

(T-32) —NH—C6H4—OCO—C6H2(CH3)(3-CH3)—O(CH2)4C(CH3)(—CH2—O—)  (epoxide with methyl)

(T-33) —NH—C6H4—OCO—C6H3(CH3)—O(CH2)3CH(—CH2—O—) (epoxide)

(T-34) —NH—C6H4—OCO—C6H3(CH3)—O(CH2)6CH(—CH2—O—) (epoxide)

(T-35) —NH—C6H4—OCO—C6H2(CH3)(CH3)—O(CH2)5CH(—CH2—O—) (epoxide)

(T-36) —NH—C6H4—OCO—C6H4—O(CH2)5CH(—CH2—O—) (meta-substituted, epoxide)

(T-37) —NH—C6H4—OCO—C6H4—COO(CH2)2CH(—CH2—O—) (meta, epoxide)

(T-38) —NH—C6H4—OCO—C6H4—COO(CH2)3CH(—CH2—O—) (meta, epoxide)

(T-39) —NH—C6H4—OCO—C6H2(Cl)(CH3)—O(CH2)2CH(—CH2—O—) (epoxide)

(T-40) —NH—C6H4—OCO—C6H3(F)—O(CH2)3CH(—CH2—O—) (epoxide)

(T-41) —NH—C6H4—OCO—C6H3(CN)—O(CH2)7CH(—CH2—O—) (epoxide)

TABLE I-continued

| Exemplified compound | Ra | Rb | Rc |
|---|---|---|---|
| (T-42) —NH—C6H4—OCO—C6H4—OCO—C6H4—O(CH2)4CH(O)CH2 | | | |
| (T-43) —NH—C6H4—OCH3 | | | |
| (T-44) —Cl | | | |
| (T-45) —OH | | | |
| (T-46) —OCH3 | | | |
| (T-47) —O—CH2CH(CH3)—OCH3 | | | |
| (T-48) —S—C6H5 | | | |
| (T-49) —O—C6H5 | | | |
| (T-50) —NH—C6H5 | | | |

The synthesis of the polymerizable compounds represented by formula (II), (III), (IV), or (V) can be carried out with reference to known methods. Examples of the synthesis include, but are not limited to, the synthetic examples as shown below.

SYNTHETIC EXAMPLE

Synthesis of Exemplified Compound (20))

The Exemplified compound (20) was synthesized, in accordance with the following scheme:

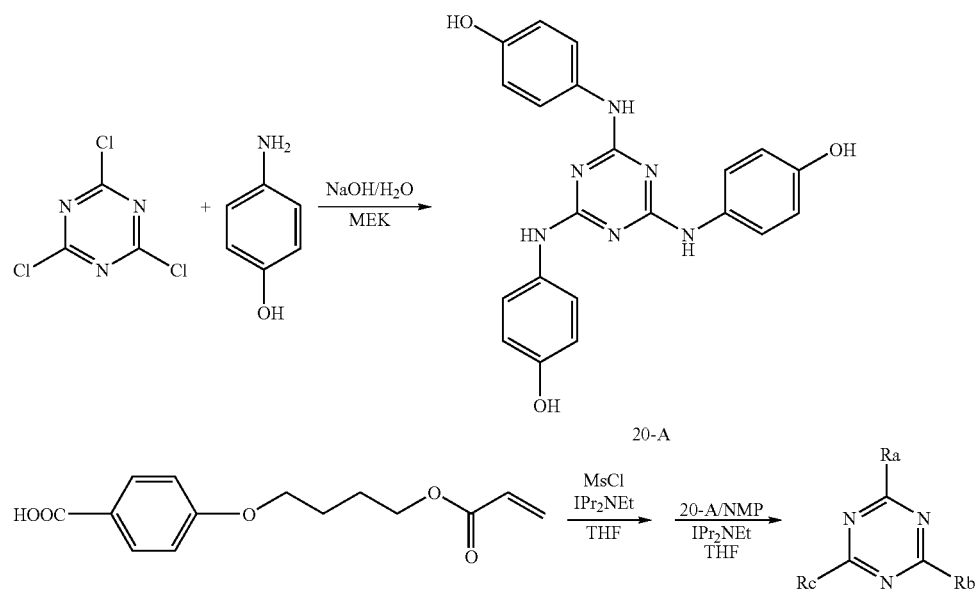

Ra = Rb = Rc =

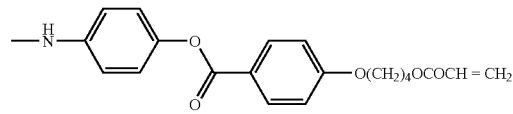

Exemplified compound (20)

A 200-ml methyl ethyl ketone solution of 36.9 g (0.2 mol) of cyanuric chloride was cooled to 15° C. under a nitrogen atmosphere. Thereto, was added, in some portions, 76.4 g (0.7 mol) of p-hydroxyaniline, while the temperature was kept at 30° C. or less. After the completion of addition, 60 ml of an aqueous solution of 12 g (0.3 mol) sodium hydroxide was added dropwise thereto. The reaction system was stirred until its temperature reached room temperature, and then the temperature of the system was raised to 55° C., followed by stirring for further 2 hours. Thereafter, the temperature of the reaction system was raised to 70° C., followed by stirring for further 1 hour. The completion of the reaction was confirmed by TLC, and then methyl ethyl ketone was removed off by distillation under reduced pressure. To the residue, 500 ml of water was added, to prepare a dispersion. Three cycles of separation of the resultant solid by filtration, dispersion of the solid into water, and separation of the solid by filtration were performed, and then the resultant solid was dried, to give 72.4 g of (20-A) (yield 90%).

Under cooling on ice, 1.55 ml (20 mmol) of methanesulfonic chloride was added to 50 ml of a tetrahydrofuran solution of 4.8 g (18 mmol) of 4-(4-acryloyloxybutoxy)-benzoate, and 3.5 ml (20 mmol) of N,N-diisopropylethylamine was slowly added dropwise thereto. After stirring for 1 hour, 3.5 ml (20 mmol) of N,N-diisopropylethylamine was added thereto, and a solution of 2 g of (20-A) in 15 ml of N-methylpyrrolidone was added dropwise thereto. Thereafter, a 5-ml tetrahydrofuran (THF) solution of 0.02 g of N,N-dimethylaminopyridine was added dropwise thereto. The resultant mixture was stirred under ice-cooling for 1 hour, and then heated to room temperature, followed by stirring for 6 hours. The reaction liquid was added dropwise to 200 ml of methanol, and the resultant crystal was separated by filtration, and purified by silica gel column chromatography, to give 2.7 g of Exemplified compound (20) (yield 47%). The compound had a melting point of 157° C. and exhibited liquid crystallinity. This compound was a compound showing nematic phase at 157° C., and it was turned to an isotropic liquid at 162° C.

A preferable embodiment of the present invention is a liquid crystal composition containing at least one compound represented by formula (I) and at least one compound represented by formula (II), (III), (IV) or (V). Examples of substances to be contained together with the above compounds in the composition include, but are not limited to, a polymerization initiator, a polymerizable or non-polymerizable liquid crystalline compound and a non-liquid crystalline compound.

Further, the composition of the present invention can be easily polymerized, according to a usual manner.

For example, the composition of the present invention can be favorably used for an optically anisotropic material, for example, for an optical compensation sheet and a polarizing plate.

The refractive index anisotropy (birefringence difference, Δn) of the optically anisotropic material of the present invention is preferably 0.1 or more, more preferably from 0.1 to 0.3.

As a mixing ratio of the compound represented by formula (I) with the compound represented by formula (II), (III), (IV) or (V) in the liquid crystal composition of the present invention, it is preferable to use the compound represented by formula (II), (III), (IV) or (V) is preferably used in an amount of from 0.04 to 20 mass parts, more preferably in an amount of from 0.09 to 9 mass parts, and furthermore preferably in an amount of from 0.09 to 4 mass parts, per 1 mass part of the compound represented by formula (I). Here, when two or more kinds of the compound represented by formula (I) are used in combination, the above-described amount ratio represents a total mass part of the compounds represented by formula (I). Similarly, when two or more kinds of the compound represented by formula (II), (III), (IV) or (V) are used in combination, the ratio represents a total mass part of the compounds represented by formula (II), (III), (IV) or (V).

Next, preferable embodiments of the optical anisotropic materials of the present invention are explained with reference to an optical anisotropic layer as an example.

The optical anisotropic layer is characterized in the layer formed by a process of applying, onto a surface of an orientation film (alignment film), the composition containing at least one of each of compounds defined in the present invention, thereby to make it a certain orientation state, followed by fixing. The compounds defined in the present invention preferably show nematic phase or smectic phase singly or together with other additives.

The composition of the present invention may be used alone or in combination with a plurality of other polymerizable compounds. Alternatively, the composition of the present invention may be used in combination with a non-polymerizable compound. Each compound that is used alone or in combination may show nematic liquid crystal phase, smectic liquid crystal phase, or cholesteric liquid crystal phase. In the present invention, it is preferable that the liquid crystal composition containing an additive or the like usable for forming the optical anisotropic layer shows nematic phase, smectic phase, or cholesteric phase (for example, in the state where a solvent being previously contained in a coating solution has gone through volatilization in the process of drying by heating) in a temperature of orientation and fixing.

As the compound that can be used together with the compounds defined in the present invention, preferred is a rod-like liquid crystalline compound. Specifically, preferably used compounds are azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyldioxanes, tolans, and alkenylcyclohexylbenzonitriles. Liquid crystalline compounds having, in their molecules, a partial structure capable of causing polymerization or a crosslinking reaction by radiation such as active light beam and electron beam, or by a heating are preferably used as the liquid crystal molecule. The number of partial structure in the compound is preferably in the range of from 1 to 6, and more preferably from 1 to 3. As described above, the rod-like liquid crystalline compound that can be used in the present invention generally has two or more polymerizable groups for fixation of its orientation state. As the polymerizable groups, preferred is a radical polymerizable unsaturated group. Specifically, there can be exemplified polymerizable groups and polymerizable liquid crystalline compounds described in JP-T 2000-514202 ("JP-T" means published searched patent publication) and JP-A-2002-62427.

<Additives>

To the composition that is used for forming an optical anisotropic layer, there may be added an additive for promoting a molecular orientation of the rod-like liquid crystalline compound. A content of the additive for promoting the orientation in the composition is preferably 0.01 to 10 mass %, more preferably from 0.05 to 5 mass %, and furthermore preferably from 0.05 to 4 mass %, with respect to the liquid crystalline compound. The additive for promoting the orientation contributes to a molecular orientation of the liquid crystalline compound by excluded volume effect or an electrostatic effect at the air interface or orientation layer interface. As the additive, there can be used those compounds described in JP-A-2002-20363 and JP-A-2002-129162. Further, to the present invention, there can be properly applied the subject matters described in JP-A-2004-53981, paragraph Nos. [0072] to [0075], JP-A-2004-4688, paragraph Nos. [0071] to [0078], and JP-A-2004-139015, paragraph Nos. [0052] to [0054], [0065] to [0066] and [0092] to [0094].

Further, explained are additives for promoting horizontal orientation that can be used at the time when the rod-like liquid crystalline compound that can be used in the present invention are horizontally orientated.

<Horizontal Orientation Agent>

Examples of the additive for promoting the horizontal orientation that can be used at the time when the rod-like liquid crystalline compound that can be used in the present invention are horizontally orientated to form an optical anisotropic layer, include additives for promoting the horizontal orientation described in JP-A-2005-99248. Particularly, it is preferable to incorporate at least one compound represented by formula (VI) set forth below. Here, the term "horizontal orientation" used in the present specification generally means that long axis direction of the liquid crystalline compound is parallel to horizontal plane of the liquid crystal layer (for example, when a liquid crystal layer has been formed on a support, a surface of the support corresponds to the horizontal plane). However, the meaning of the term should not be strictly construed, and the term "horizontal orientation" used in the present specification means such the orientation that angle of inclination between the long axis direction of the liquid crystalline compound and the horizontal plane is less than 15°. The angle of inclination is preferably 10° or less, more preferably 5° or less, further more preferably 2° or less, and most preferably 1° or less. The angle of inclination may be zero degree. The content in the composition of the additive for promoting the horizontal orientation is preferably from 0.01 to 20 mass %, more preferably from 0.05 to 10 mass %, and furthermore preferably from 0.05 to 5 mass %, with respect to the liquid crystalline compound. The additive for promoting the horizontal orientation represented by formula (VI) may be used alone or in combination of two or more additives.

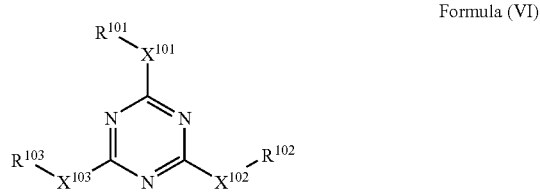

Formula (VI)

In formula (VI), $R^{101}$, $R^{102}$ and $R^{103}$ each independently represent a hydrogen atom or a substituent; and $X^{101}$, $X^{102}$ and $X^{103}$ each independently represent a single bond or a divalent linking group.

In formula (VI), the substituent represented by $R^{101}$, $R^{102}$ and $R^{103}$ has the same meaning as those of $R_1$ and $R_2$ in formula (II), and its preferable range is also the same. The substituent may be further substituted with these substituents. In the case that the compound has two or more substituents, these substituents may be the same or different. If possible, these substituents may be bonded together to form a ring.

As the substituent represented by $R^{101}$, $R^{102}$ and $R^{103}$, preferred is a substituted or unsubstituted alkyl group (preferably, an unsubstituted alkyl group or a fluorine-substituted alkyl group), a substituted or unsubstituted aryl group (preferably, an aryl group having a fluorine-substituted alkyl group), a substituted or unsubstituted amino group, a substituted or unsubstituted alkoxy group, a substituted or unsubstituted alkylthio group or a halogen atom.

In formula (VI), the divalent linking group represented by $X^{101}$, $X^{101}$ and $X^{103}$ is preferably selected from the group consisting of an alkylene group, an alkenylene group, a divalent aromatic group, a divalent heterocyclic group, —CO—, —NR$^a$— (in which R$^a$ represents an alkyl group having 1 to 5 carbon atoms, or a hydrogen atom), —O—, —S—, —SO—, —SO$_2$—, and a group made by any combination of two or more thereof; and more preferably a divalent linking group selected from the group consisting of an alkylene group, a phenylene group, —CO—, —NR$^a$—, —O—, —S—, and —SO$_2$—, and a group made by any combination of at least two thereof. The alkylene group preferably has 1 to 12 carbon atoms. The alkenylene group preferably has 2 to 12 carbon atoms. The divalent aromatic group preferably has 6 to 10 carbon atoms. If possible, the alkylene group, the alkenylene group and the divalent aromatic group may be substituted with a group (e.g., an alkyl group, a halogen atom, a cyano group, an alkoxy group, an acyloxy group) exemplified as the substituent represented by $R^{101}$, $R^{102}$ and $R^{103}$.

Of the compound represented by formula (VI), especially preferred is a compound represented by formula (VIa) or (VIb).

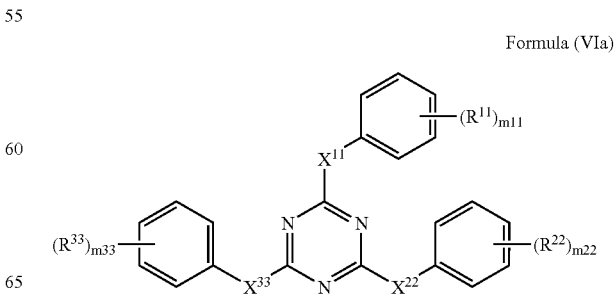

Formula (VIa)

In formula (VIa), $R^{11}$, $R^{22}$ and $R^{33}$ each independently represent a hydrogen atom or a substituent; $X^{11}$, $X^{22}$ and $X^{33}$ each independently represent —NH—, —O— or —S—; and $m^{11}$, $m^{22}$ and $m^{33}$ each independently represent an integer of 1 to 3.

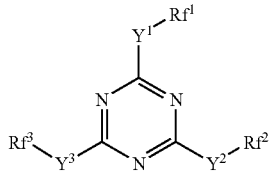

Formula (VIb)

In formula (VIb), $Rf^1$, $Rf^2$ and $Rf^3$ each independently represent an alkyl group having $CF_3$ group(s) or $CF_2H$ group(s) at its terminal; $Y^1$, $Y^2$ and $Y^3$ each independently represent a divalent linking group selected from the group consisting of an alkylene group, —CO—, —NH—, —O—, —S—, —SO$_2$—, and a group made by any combination of at least two groups thereof.

First, the compound represented by formula (VIa) is explained.

The substituent represented by $R^{11}$, $R^{22}$ and $R^{33}$ has the same meaning as those of $R^{101}$, $R^{102}$ and $R^{103}$ in formula (VI), and its preferable range is also the same. The substituent represented by $R^{11}$, $R^{22}$ and $R^{33}$ is particularly preferably an alkoxy group having $CF_3$ group(s) or $CF_2H$ group(s) at its terminal. The alkoxy group may be a straight chain form or a branched chain form. The number of carbon atoms in the alkoxy group is preferably from 4 to 20, more preferably from 4 to 16, and particularly preferably from 6 to 16. The alkoxy group having $CF_3$ group(s) or $CF_2H$ group(s) at its terminal is an alkoxy group in which hydrogen atoms are partially or entirely replaced by fluorine atoms. In this case, the hydrogen atoms in the alkoxy group are replaced by fluorine atoms in a ratio of preferably 50% or more, more preferably 60% or more, and particularly preferably 70% or more. Specific examples of the alkoxy group having $CF_3$ group(s) or $CF_2H$ group(s) at its terminal represented by $R^{11}$, $R^{22}$ and $R^{33}$ are shown below, but the present invention is not limited to these.

| | |
|---|---|
| R1: | n-C$_8$F$_{17}$—O— |
| R2: | n-C$_6$F$_{13}$—O— |
| R3: | n-C$_4$F$_9$—O— |
| R4: | n-C$_8$F$_{17}$—(CH$_2$)$_2$—O—(CH$_2$)$_2$—O— |
| R5: | n-C$_6$F$_{13}$—(CH$_2$)$_2$—O—(CH$_2$)$_2$—O— |
| R6: | n-C$_4$F$_9$—(CH$_2$)$_2$—O—(CH$_2$)$_2$—O— |
| R7: | n-C$_8$F$_{17}$—(CH$_2$)$_3$—O— |
| R8: | n-C$_6$F$_{13}$—(CH$_2$)$_3$—O— |
| R9: | n-C$_4$F$_9$—(CH$_2$)$_3$—O— |
| R10: | H—(CF$_2$)$_8$—O— |
| R11: | H—(CF$_2$)$_6$—O— |
| R12: | H—(CF$_2$)$_4$—O— |
| R13: | H—(CF$_2$)$_8$—(CH$_2$)—O— |
| R14: | H—(CF$_2$)$_6$—(CH$_2$)—O— |
| R15: | H—(CF$_2$)$_4$—(CH$_2$)—O— |
| R16: | H—(CF$_2$)$_8$—(CH$_2$)—O—(CH$_2$)$_2$—O— |
| R17: | H—(CF$_2$)$_6$—(CH$_2$)—O—(CH$_2$)$_2$—O— |
| R18: | H—(CF$_2$)$_4$—(CH$_2$)—O—(CH$_2$)$_2$—O— |

In formula (VIa), $X^{11}$, $X^{22}$ and $X^{33}$ each are preferably —NH— or —O—; and most preferably —NH—. $m^{11}$, $m^{22}$ and $m^{33}$ each are preferably an integer of 2.

Next, the compound represented by formula (VIb) is explained.

The alkyl group having $CF_3$ group(s) or $CF_2H$ group(s) at the terminal represented by $Rf^1$, $Rf^2$ and $Rf^3$ may be a straight chain form or a branched chain form. The number of carbon atoms of the alkyl group is preferably from 4 to 20, more preferably from 4 to 16, and particularly preferably from 6 to 16. The alkyl group may have a substituent other than the fluorine atom. The alkyl group having $CF_3$ group(s) or $CF_2H$ group(s) at its terminal is an alkyl group in which hydrogen atoms are partially or entirely replaced by fluorine atoms. The hydrogen atoms in the alkyl group are replaced by fluorine atoms in a ratio of preferably 50% or more, more preferably 60% or more, and particularly preferably 70% or more. Specific examples of the alkyl groups having $CF_3$ group(s) or $CF_2H$ group(s) at its terminal represented by $Rf^1$, $Rf^2$ and $Rf^3$ are shown below, but the present invention is not limited to these.

| | |
|---|---|
| Rf1: | n-C$_8$F$_{17}$— |
| Rf2: | n-C$_6$F$_{13}$— |
| Rf3: | n-C$_4$F$_9$— |
| Rf4: | n-C$_8$F$_{17}$—(CH$_2$)$_2$— |
| Rf5: | n-C$_6$F$_{13}$—(CH$_2$)$_2$— |
| Rf6: | n-C$_4$F$_9$—(CH$_2$)$_2$— |
| Rf7: | H—(CF$_2$)$_8$— |
| Rf8: | H—(CF$_2$)$_6$— |
| Rf9: | H—(CF$_2$)$_4$— |
| Rf10: | H—(CF$_2$)$_8$—(CH$_2$)— |
| Rf11: | H—(CF$_2$)$_6$—(CH$_2$)— |
| Rf12: | H—(CF$_2$)$_4$—(CH$_2$)— |

In formula (VIb), $Y^1$, $Y^2$ and $Y^3$ each preferably represent a divalent linking group selected from the group consisting of an alkylene group, —NH—, —O—, —S—, and a group made by any combination of at least two groups thereof $Y^1$, $Y^2$ and $Y^3$ each especially preferably represent a divalent linking group selected from the group consisting of an alkylene group, —NH—, —O—, and a group made by any combination of at least two groups thereof; and most preferably —NH—, —O— or —NH(CH$_2$)$_{n1}$—O— (in which, n1 represents an integer of 1 to 8, most preferably 3; and this divalent linking group bonds to the triazine ring via the nitrogen atom.).

Specific examples of the compound represented by formula (VI) are shown below, but the present invention is not limited thereto.

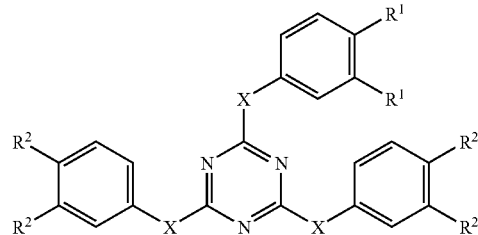

| Compound No. | R¹ | R² | X |
|---|---|---|---|
| VI-1 | —O(CH$_2$)$_3$(CF$_2$)$_4$F | —O(CH$_2$)$_3$(CF$_2$)$_4$F | —NH— |
| VI-2 | —O(CH$_2$)$_3$(CF$_2$)$_6$F | —O(CH$_2$)$_3$(CF$_2$)$_6$F | —NH— |
| VI-3 | —O(CH$_2$)$_3$(CF$_2$)$_8$F | —O(CH$_2$)$_3$(CF$_2$)$_8$F | —NH— |
| VI-4 | —OCH$_2$(CF$_2$)$_6$H | —OCH$_2$(CF$_2$)$_6$H | —NH— |
| VI-5 | —OCH$_2$(CF$_2$)$_8$H | —OCH$_2$(CF$_2$)$_8$H | —NH— |
| VI-6 | —O(CH$_2$)$_2$O(CH$_2$)$_2$(CF$_2$)$_6$F | —O(CH$_2$)$_2$O(CH$_2$)$_2$(CF$_2$)$_6$F | —NH— |
| VI-7 | —O(CH$_2$)$_2$O(CH$_2$)$_2$(CF$_2$)$_4$F | —O(CH$_2$)$_2$O(CH$_2$)$_2$(CF$_2$)$_4$F | —NH— |
| VI-8 | —O(CH$_2$)$_3$S(CH$_2$)$_2$(CF$_2$)$_6$F | —O(CH$_2$)$_3$S(CH$_2$)$_2$(CF$_2$)$_6$F | —NH— |
| VI-9 | —O(CH$_2$)$_3$S(CH$_2$)$_2$(CF$_2$)$_4$F | —O(CH$_2$)$_3$S(CH$_2$)$_2$(CF$_2$)$_4$F | —NH— |
| VI-10 | —O(CH$_2$)$_6$S(CH$_2$)$_2$(CF$_2$)$_6$F | —O(CH$_2$)$_6$S(CH$_2$)$_2$(CF$_2$)$_6$F | —NH— |
| VI-11 | —O(CH$_2$)$_6$S(CH$_2$)$_2$(CF$_2$)$_4$F | —O(CH$_2$)$_6$S(CH$_2$)$_2$(CF$_2$)$_4$F | —NH— |
| VI-12 | —OC$_{10}$H$_{21}$ | —OC$_{10}$H$_{21}$ | —NH— |
| VI-13 | —OC$_{12}$H$_{25}$ | —OC$_{12}$H$_{25}$ | —NH— |
| VI-14 | —OC$_8$H$_{17}$ | —OC$_{12}$H$_{25}$ | —NH— |
| VI-15 | —OC$_{16}$H$_{33}$ | —OC$_{12}$H$_{25}$ | —NH— |
| VI-16 | —OC$_{12}$H$_{25}$ | —OC$_{16}$H$_{33}$ | —NH— |
| VI-17 | —O(CH$_2$)$_2$O(CH$_2$)(CF$_2$)$_6$H | —O(CH$_2$)$_2$O(CH$_2$)(CF$_2$)$_6$H | —NH— |
| VI-18 | —O(CH$_2$)$_3$(CF$_2$)$_6$F | —O(CH$_2$)$_3$(CF$_2$)$_6$F | —O— |
| VI-19 | —OCH$_2$(CF$_2$)$_6$H | —OCH$_2$(CF$_2$)$_6$H | —O— |
| VI-20 | —O(CH$_2$)$_2$O(CH$_2$)$_2$(CF$_2$)$_6$F | —O(CH$_2$)$_2$O(CH$_2$)$_2$(CF$_2$)$_6$F | —O— |
| VI-21 | —O(CH$_2$)$_3$S(CH$_2$)$_2$(CF$_2$)$_6$F | —O(CH$_2$)$_3$S(CH$_2$)$_2$(CF$_2$)$_6$F | —O— |
| VI-22 | —O(CH$_2$)$_2$O(CH$_2$)(CF$_2$)$_6$H | —O(CH$_2$)$_2$O(CH$_2$)(CF$_2$)$_6$H | —O— |
| VI-23 | —O(CH$_2$)$_3$(CF$_2$)$_6$F | —O(CH$_2$)$_3$(CF$_2$)$_6$F | —S— |
| VI-24 | —OCH$_2$(CF$_2$)$_6$H | —OCH$_2$(CF$_2$)$_6$H | —S— |
| VI-25 | —O(CH$_2$)$_2$O(CH$_2$)$_2$(CF$_2$)$_6$F | —O(CH$_2$)$_2$O(CH$_2$)$_2$(CF$_2$)$_6$F | —S— |
| VI-26 | —O(CH$_2$)$_3$S(CH$_2$)$_2$(CF$_2$)$_6$F | —O(CH$_2$)$_3$S(CH$_2$)$_2$(CF$_2$)$_6$F | —S— |
| VI-27 | —O(CH$_2$)$_2$O(CH$_2$)(CF$_2$)$_6$H | —O(CH$_2$)$_2$O(CH$_2$)(CF$_2$)$_6$H | —S— |

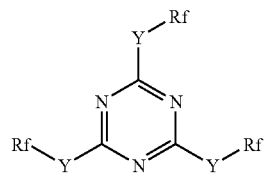

| Compound No. | Rf | Y |
|---|---|---|
| VI-28 | —(CH$_2$)$_2$CF$_2$)$_4$F | —O— |
| VI-29 | —(CH$_2$)$_2$(CF$_2$)$_6$F | —O— |
| VI-30 | —(CH$_2$)$_2$(CF$_2$)$_8$F | —O— |
| VI-31 | —CH$_2$(CF$_2$)$_6$H | —O— |
| VI-32 | —CH$_2$(CF$_2$)$_8$H | —O— |
| VI-33 | —(CH$_2$)$_2$(CF$_2$)$_6$F | —O(CH$_2$)$_2$O— |
| VI-34 | —(CH$_2$)$_2$(CF$_2$)$_4$F | —O(CH$_2$)$_2$O— |
| VI-35 | —(CH$_2$)$_2$(CF$_2$)$_6$F | —O(CH$_2$)$_3$S— |
| VI-36 | —(CH$_2$)$_2$(CF$_2$)$_6$F | —O(CH$_2$)$_6$S— |
| VI-37 | —(CH$_2$)$_3$(CF$_2$)$_6$F | —NH(CH$_2$)$_3$O— |
| VI-38 | —CH$_2$(CF$_2$)$_6$H | —NH(CH$_2$)$_3$O— |
| VI-39 | —CH$_2$(CF$_2$)$_8$H | —NH(CH$_2$)$_3$O— |

In the exemplified compounds VI-28 to VI-39, the triazine ring bonds to the left side of the linking group Y, and the alkyl group Rf bond to the right side of the linking group Y.

Of these compounds, the compound represented by formula (VIa) is particularly preferable. Accordingly, the compounds VI-1 to VI-27 can be preferably used, and the compounds VI-1 to VI-17 can be especially preferably used.

As to a specific synthesis method of the compound having a 1,3,5-triazine ring represented by formula (VI) that can be used in the present invention, there are described in JP-A-2005-99248, paragraph Nos. [0099] to [0112]

<Chain Transfer Agent>

A chain transfer agent may be contained in the composition of the present invention for forming the optical anisotropic layer. The content of the chain transfer agent in the composition is preferably from 0.01 to 10 mass %, more preferably from 0.05 to 5 mass %, and furthermore preferably from 0.05 to 4 mass %, with respect to the liquid crystalline compound.

As a specific chain transfer agent, generally known compounds may be used; and a compound having a mercapto group (e.g., thiol compounds such as dodecyl mercaptan, octyl mercaptan, trimethylolpropane tris(3-mercaptopropionate) and pentaerythritol tetrakis(3-mercaptopropionate)), and a disulfide compound (e.g., dipheny disulfide) are preferable.

The chain transfer agent is required of compatibility with the liquid crystalline compound. Accordingly, the thiol compound showing liquid crystallinity is more preferable from a viewpoint of compatibility. Examples of the thiol compound showing liquid crystallinity include compounds described in U.S. Pat. No. 6,096,241.

<Other Components in the Composition for Forming the Optical Anisotropic Layer>

In the composition of the present invention, such as a coating solution, for forming the optical anisotropic layer, in addition to the compounds defined in the present invention, an optionally added liquid crystalline compound and an optionally added orientation-promoting agent and chain transfer agent as described above, and there may be contained, for example, a polymerization initiator, a plasticizer, a surface active agent and/or a polymerizable monomer. These components are added for various purposes, such as improvement in fixation of orientation, uniformity of the coated firm, strength of the film, and the orientation of the liquid crystal compound. It is preferable that these components are compatible with the liquid crystal compound used in combination therewith, and do not hinder the orientation.

As the polymerization initiator, a thermal polymerization initiator and a photopolymerization initiator may be used. Of these initiators, a photopolymerization initiator is preferable. Examples of the photopolymerization initiator include α-carbonyl compounds (described in U.S. Pat. Nos. 2,367,661 and 2,367,670), acyloin ethers (described in U.S. Pat. No. 2,448, 828), α-hydrocarbon-substituted acyloin compounds (described in U.S. Pat. No. 2,722,512), polynuclear quinone compounds (described in U.S. Pat. Nos. 3,046,127 and 2,951, 758), combinations of a triarylimidazole dimer with p-aminophenyl ketone (described in U.S. Pat. No. 3,549,367), acridine and phenazine compounds (described in JP-A-60-105667 and U.S. Pat. No. 4,239,850) and oxadiazol compounds (described in U.S. Pat. No. 4,212,970). It is preferable to use the photopolymerization initiator in an amount of from 0.01 to 20 mass %, more preferably from 0.5 to 10 mass %, based on the solid matters in the coating solution.

The polymerizable monomer may be a radical polymerizable compound or a cation polymerizable compound, and is preferably a polyfunctional radical polymerizable monomer. Preferably, the polymerizable monomer is a monomer copolymerizable with the above-mentioned liquid crystal compound having the polymerizable group. Examples thereof include monomers described in JP-A-2002-296423, paragraph Nos. [0018] to [0020].

Specific examples of the polyfunctional monomer are set forth below. However, the present invention is not limited to these.

Examples of a bifunctional (meth)acrylate include ethyleneglycol (meth)acrylate, 1,6-hexanediol (meth)acrylate, polypropyleneglycol (meth)acrylate, and tetraethyleneglycol (meth)acrylate. Examples of commercial products thereof include ARONIX M-210 and ARONIX M-6200 (trade names, manufactured by TOAGOSET CO., LTD.), KAYARAD HDDA and KAYARAD HX-220 (trade names, manufactured by Nippon Kayaku CO., LTD.), Viscote 260 and Viscote 335HP (trade names, manufactured by Osaka Organic Chemical Industry Ltd.), and NK ester A-200, NK ester A-HD-N, NK ester A-DOD, and NK ester ABE-300 (trade names, manufactured by SHIN-NAKAMURA CHEMICAL CO., LTD.).

Examples of a tri- or more polyfunctional (meth)acrylate include trimethylolpropane tri(meth)acrylate, pentaerythritol tri(meth)acrylate, tri((meth)acryloyloxyethyl)phosphate, pentaerythritol tetra(meth)acrylate, dipentaerythritol penta (meth)acrylate, dipentaerythritol hexa(meth)acrylate, poly (meth)acrylate of a polyether-based polyol, poly(meth)acrylate of a polyester-based polyol, and poly(meth)acrylate of a polyurethane-based polyol.

Examples of commercial products thereof include ARONIX M-309, ARONIX M-402, ARONIX M-7100, ARONIX M-8030 and ARONIX M-8060 (trade names, manufactured by TOAGOSEI CO., LTD.), KAYARAD TMPTA, KAYARAD DPHA, KAYARAD DPCA-20, KAYARAD DPCA-30, KAYARAD DPCA-60, KAYARAD DPCA-120 and KAYARAD SR355 (trade names, manufactured by Nippon Kayaku CO., Ltd.), Viscote 295, Viscote 300, Viscote 360 and Viscote 400 (trade names, manufactured by Osaka Organic Chemical Industry Ltd.), and NK ester A-TMPT, NK ester A-TMPT-3EO, NK ester A-TMM-3, NK ester A-DPH and NK ester A-TMMT (trade names, manufactured by SHIN-NAKAMURA CHEMICAL CO., LTD.).

These polyfunctional monomers are used alone or in combination. A combination use of the monomers is effective for regulation of both viscosity and strength. An addition amount of the above-described compound is generally in the range of from 1 to 50 mass %, and preferably from 1 to 30 mass %, based on the liquid crystal compound.

Examples of the surfactant include known conventional compounds. A fluorine-containing compound is particularly preferable. Specific examples thereof include compounds described in JP-A-2001-330725, paragraphs Nos. [0028] to [0056].

It is preferable that the polymer to be used with the liquid crystal compound is a polymer capable of thickening the coating solution. Examples of the polymer include a cellulose ester. Preferable examples of the cellulose ester are described in JP-A-2000-155216, paragraph No. [0178]. In order not to hinder the orientation of the liquid crystal compounds, the added amount of the polymer is preferably from 0.1 to 10 mass %, more preferably from 0.1 to 8 mass % of the liquid crystal compounds.

<Solvent>

The liquid crystal composition of the present invention can be prepared by an ordinary method, for example, by adding the compounds defined in the present invention to a solvent.

As the solvent to be used in preparing the coating solution, it is preferable to use an organic solvent. Examples of the organic solvent include amides (for example, N,N-dimethylformamide), sulfoxides (for example, dimethyl sulfoxide), heterocyclic compounds (for example, pyridine), hydrocarbons (for example, benzene and hexane), alkyl halides (for example, chloroform and dichloromethane), esters (for example, methyl acetate and butyl acetate), ketones (for example, acetone and methyl ethyl ketone) and ethers (for example, tetrahydrofuran and 1,2-dimethoxyethane). Among these, alkyl halides, esters and ketones are preferred, and esters and ketones are especially preferred. It is also possible to use two or more organic solvents together.

The coating solution can be applied by a known method (for example, an extrusion coating method, a direct gravure coating method, a reverse gravure coating method or a die coating method).

Fixation of the orientation state of the liquid crystal compound can be performed by polymerization reaction of the polymerizable compounds. In the polymerization reaction performed for fixation, it is preferable to apply a photopolymerization reaction using a photopolymerization initiator. In the photoirradiation for polymerizing the liquid crystal molecules, it is preferable to use ultraviolet rays. The irradiation energy preferably ranges from 20 mJ/cm$^2$ to 50 J/cm$^2$, more preferably from 100 to 800 mJ/cm$^2$. To accelerate the photopolymerization reaction, the photoirradiation may be carried out under heating. Further, polymerization may be performed under a reduced oxygen density.

The thickness of the optical anisotropic layer described above is preferably from 0.1 to 10 μm, more preferably from 0.2 to 5 μm, and further preferably from 0.5 to 5 μm.

As a result of detailed studies about uniformity of the orientation before the polymerization, the following preferable embodiments have been found. After coating the above-described composition, it is preferable to keep the coating in a state of nematic phase or isotropic phase, and then convert the state to smectic phase by cooling. A temperature over the transition temperature to smectic phase is preferably 0.1° C. or more, more preferably 1° C. or more, and furthermore preferably from 5° C. to 20° C. A time for a heat treatment to keep in nematic phase or isotropic phase is preferably 10 seconds or longer, more preferably 20 seconds or longer, and furthermore preferably from 30 seconds to 3 minutes.

<Orientation Film>

In the present invention, an orientation film is used to prepare an optical anisotropic layer. The orientation film has a function to regulate an orientating direction of the liquid crystal molecules. Further, the orientation film is used in order to improve uniformity of orientation, and also to improve adhesion properties between the optical anisotropic layer and a polymer substrate used as a support. After orientation of the liquid crystal compound, if the orientation state has been fixed, an orientation film finishes its role. Consequently, the orientation film may be removed. Namely, only the optical anisotropic layer of which the orientation state has been fixed may be transferred onto another support or a polarizer.

The orientation film can be provided by rubbing an organic compound (preferably a polymer), oblique evaporation of an inorganic compound, forming a layer having a microgroove, or accumulation of an organic compound (for example, ω-tricosanoic acid, dioctadecylmethylammonium chloride or methyl stearate) by the Langmuir-Blodgett method (LB film). Furthermore, there have been known orientation films having an orienting function imparted thereto by applying an electrical field, applying a magnetic field or irradiating with light.

In the present invention, it is preferable to not only cause the polymer used in the oriented film to have the above-mentioned function of orienting liquid crystal molecules, but also introduce, into the main chain of the polymer, a side chain having a crosslinkable functional group (for example, a double bond), or it is preferable to introduce, into a side chain of the polymer, a crosslinkable functional group having a function of orienting liquid crystal molecules.

The polymer to be used for the orientation can be polymers capable of cross-linking by themselves, polymers capable of undergoing cross-linking reaction in the presence of a cross-linking agent, or combinations thereof.

Examples of the polymer include methacrylate-series polymer, styrene-series polymers, polyolefins, polyvinyl alcohols (PVAs), modified PVAs, poly(N-methylolacrylamides), polyesters, polyimides, vinyl acetate polymers, carboxymethyl celluloses, polycarbonates, and the like described in paragraph No. [0022] of the specification in JP-A-8-338913. A silane coupling agent can be used as a polymer. The polymer preferably include water-soluble polymers such as poly(N-methylolacrylamides), carboxymethyl celluloses, gelatin, PVAs and modified PVAs, more preferably gelatin, PVAs and modified PVAs, most preferably PVAs and modified PVAs. It is particularly preferred to use two kinds of polyvinyl alcohols or modified polyvinyl alcohols having different polymerization degrees.

PVAs usable in the invention have a saponification degree in the range of, preferably 70 to 100%, more preferably 80 to 100%. The suitable polymerization degree thereof is from 100 to 5,000.

The side chain having a function of orienting liquid crystal molecules in general has a hydrophobic group as a functional group. The specific kind of the functional group is decided dependently on the kind of the liquid crystal molecules and a required orientation state.

Modifying groups of the modified polyvinyl alcohol can be introduced by copolymerization, by chain transfer and by block polymerization. Examples of the modifying group include a hydrophilic group (e.g., carboxylic group, sulfonic group, phosphonic group, amino group, ammonium group, amido group, thiol group), a hydrocarbon group having 10 to 100 carbon atoms, a fluorine-substituted hydrocarbon group, a thioether group, a polymerizable group (e.g., unsaturated polymerizable group, epoxy group, aziridinyl group), and an alkoxysilyl group (e.g., trialkoxysilyl, dialkoxysilyl, monoalkoxysilyl). The modified polyvinyl alcohols are, e.g., described in JP-A-2000-155216, paragraph Nos. [0022] to [0145], and JP-A-2002-62426, paragraph Nos [0018] to [0022].

When a side chain having a crosslinkable functional group is bonded to the main chain of the orientation film polymer or a crosslinkable functional group is introduced into a side chain thereof having a function of orienting liquid crystal molecules, the orientation film polymer can be copolymerized with a polyfunctional monomer contained in the optical anisotropic layer. As a result, strong bonding based on covalent bonds is attained between the polyfunctional monomer molecules, between the orientation film polymer molecules, and between the polyfunctional monomer molecule and the orientation film polymer molecule. Consequently, the introduction of the crosslinkable functional group into the orientation film polymer makes it possible to improve the strength of the optical compensating sheet remarkably.

The crosslinkable functional group of the orientation film polymer preferably contains a polymerizable group in the same manner as the polyfunctional monomer. Specific examples thereof are described in JP-A-2000-155216, paragraph Nos. [0080] to [0100].

The orientation film polymer can be crosslinked with a crosslinking agent, separately from the above-mentioned crosslinkable functional group.

Examples of the crosslinking agent for the polymer include aldehydes, N-methylol compounds, dioxane derivatives, compounds that works when the carboxylic group is activated, active vinyl compounds, active halogen compounds, isooxazoles and dialdehyde starch. Two or more crosslinking agents may be used in combination. Compounds described in, e.g., JP-A-2002-62426, paragraph Nos. [0023] to [0024] can be used. Reactive aldehydes are preferred, and glutaraldehyde is particularly preferred.

The amount of the crosslinking agent is in the range of preferably 0.1 to 20 mass %, more preferably 0.5 to 15 mass % based on the amount of the polymer. The amount of nonreacted crosslinking agent remaining in the orientation film is preferably 1.0 mass % or less, more preferably 0.5 mass % or less. The adjustment as described above makes it possible to give a sufficient endurance to the orientation film without generating any reticulation even if the orientation film is used in a liquid crystal display device for a long time or is allowed to stand still in high-temperature and high-humidity atmosphere for a long time.

The orientation film can be basically formed by coating a solution containing the polymer (the orientation film forming material) and the cross-linking agent as recited above on a transparent substrate, drying by heating (to cause cross-linking reaction), and rubbing the coating surface if necessary. The cross-linking reaction, as mentioned above, may be carried out in an arbitrary stage after coating the solution on the transparent substrate. In the case of using a water-soluble polymer, such as PVA, as the orientation film forming material, a mixture of water with an organic solvent having a defoaming action, such as methanol, is preferably employed as the solvent of the coating solution. The suitable ratio of water to methanol is preferably from 0:100 to 99:1, more preferably from 0:100 to 91:9, by mass. By the use of such a mixed solvent, the generation of foams can be prevented to ensure markedly decreased defects in the orientation film, especially the surface of the optical anisotropic layer.

Preferred examples of a coating method for forming the orientation film include a spin coating method, a dip coating method, a curtain coating method, an extrusion coating method, a rod coating method and a roll coating method. Of these methods, the rod coating method is particularly preferred over the others. The suitable thickness of the film after drying is from 0.1 to 10 µm. The drying by heating can be performed at a temperature of 20° C. to 110° C. In order to form cross-links to a satisfactory extent, the drying temperature is preferably from 60° C. to 100° C., particularly preferably from 80° C. to 100° C. The drying time is generally from 1 minute to 36 hours, preferably from 1 to 30 minutes. Further, it is preferable to adjust the pH to an optimum value for the cross-linking agent used. In the case of using glutaraldehyde as the cross-linking agent, the suitable pH is from 4.5 to 5.5, preferably 4.8 to 5.2.

The orientation layer may be provided on the transparent support or an undercoating layer. After the above-described polymer layer is crosslinked, the surface of the layer may, if necessary, be subjected to rubbing treatment to form the orientation layer.

For the rubbing treatment can be adopted the treatment methods widely used for orientating liquid crystals of LCD. More specifically, the method of rubbing the surface of an orientation film in a fixed direction by means of paper, gauze, felt, rubber or nylon, or polyester fiber can be employed for orientation. In general the orientation can be carried out by rubbing several times the surface with cloth into which fibers having the same length and the same diameter are transplanted evenly.

[Support]

In the present invention, the optical anisotropic layer may be formed on a support. The support is preferably transparent. Specifically, preferred is a support having light transmittance of 80% or more.

Examples of a polymer film to be used as the support include films of cellulose ester, polycarbonate, polysulfone, polyethersulfone, polyacrylate or polymethacrylate. Of these films, preferred is a cellulose ester film, more preferred is an acetylcellulose film, and most preferred is a triacetylcellulose film. The polymer film is preferably formed according to a solvent cast method. A thickness of the transparent support is preferably from 20 to 500 µm, more preferably from 40 to 200 µm. In order to improve adhesion properties between the transparent support and a layer provided thereon (e.g., an adhesion layer, a vertical orientation layer, or a phase difference layer), the transparent support may be subjected to a surface treatment (for example, a glow discharge treatment, a corona discharge treatment, an ultraviolet (UV) ray treatment, a flame treatment, a saponification treatment). An adhesion layer (subbing layer) may be applied onto the transparent support. Further, for providing a sliding property at the transport process thereof or preventing the front surface and the back surface of the transparent support from adhering to each other, it is preferable to use a substrate, in which a polymer layer containing inorganic particles having an average particle size of from about 10 nm to about 100 nm in solid content mass ratio of from 5% to 40% is provided on one side of the transparent support or a long transparent support by coating or co-flow casting with the support.

According to the present invention, it is possible to provide a liquid crystal composition that can reduce turbulence of orientation of a liquid crystal material, and prevent optical characteristics of the liquid crystal material from deteriorating, and an anisotropic material using the composition, especially an optical compensating material.

The liquid crystal composition of the present invention obtained by using specific liquid crystal compounds can reduce turbulence of orientation occurring at the time when the liquid crystal composition is used as a liquid crystal material, and prevent the liquid crystal material from deteriorating of optical characteristics. Accordingly, the anisotropic material obtained by use of such the liquid crystal composition is excellent in fixation properties of the orientation, thereby to provide a uniform orientation condition.

The present invention will be described in more detail based on the following examples, but the invention is not intended to be limited thereto.

EXAMPLES

Example 1

A 1,1,2-triclhloroethane solution comprised of 35% of a mixture of 80 parts by mass of Exemplified compound (I-25), 20 parts by mass of Exemplified compound (20) and 1 part by mass of Irgacure 819 (trade name, manufactured by Ciba Speciality Chemicals) as a polymerization initiator, was applied by spin coating onto a glass plate, on which a polyimide orientation film was already provided, to prepare a thin film. After heating the resultant thin film at a substrate temperature of 135° C., the temperature was cooled down to 110° C. at a rate of 5° C./min. Thereafter, an orientation state of the optical anisotropic layer was fixed by irradiating ultraviolet rays of 600 mJ/cm$^2$ under the oxygen density of 5% or less, thereby to prepare an anisotropic material A. A thickness of the thus-formed optical anisotropic layer was 1.98 µm. By investigation of the anisotropic material using a polarization microscope, a complete dark field was observed. As a result of observation of a conoscopic figure, or the like, it was found that a slow phase axis showed optical anisotropic properties perpendicular to the substrate.

Comparative Example 1

A coating solution was prepared in the same manner as in Example 1, except that 100 parts by mass of Exemplified compound (I-25) was used alone in place of the combination of Exemplified compound (I-25) and Exemplified compound (20). Then, the prepared coating solution was coated on the same glass substrate as used in Example 1. After heating the resultant thin film at a substrate temperature of 140° C., the temperature was cooled down to 115° C. at a rate of 5° C./min. Thereafter, an orientation state of the optical anisotropic layer was fixed by irradiating ultraviolet rays of 600 mJ/cm$^2$ under the oxygen density of 5% or less, thereby to prepare an anisotropic material B. A thickness of the thus-formed optical anisotropic layer was 1.98 μm. By investigation of the anisotropic material using a polarization microscope, almost dark field was observed. But, several tens of bright spots were observed. As a result of observation of a conoscopic figure, or the like, it was found that a slow phase axis showed optical anisotropic properties perpendicular to the substrate.

Comparative Example 2

A coating solution was prepared in the same manner as in Example 1, except that 100 parts by mass of Exemplified compound (20) was used alone in place of the combination of Exemplified compound (I-25) and Exemplified compound (20). Then, the prepared coating solution was coated on the same glass substrate as used in Example 1. After heating the resultant thin film at a substrate temperature of 140° C., the temperature was cooled down to 120° C. at a rate of 5° C./min. Thereafter, an orientation state of the optical anisotropic layer was fixed by irradiating ultraviolet rays of 600 mJ/cm$^2$ under the oxygen density of 5% or less, thereby to prepare an anisotropic material C. A thickness of the thus-formed optical anisotropic layer was 2.6 μm. By investigation of the anisotropic material using a polarization microscope, schlieren was observed. Consequently, a uniform orientation state was not achieved.

Example 2

Anisotropic materials D, E, F and G were prepared in the same manner as in Example 1, except that Exemplified compound (40), (32), (34) and (48) were used, respectively, in place of Exemplified compound (20) used in Example 1. By investigation of the anisotropic materials using a polarization microscope, a complete dark field was observed. As a result of observation of a conoscopic figure, or the like, it was found that a slow phase axis showed optical anisotropic properties perpendicular to the substrate.

Example 3

A chloroform solution comprised of 15% of a mixture of 80 parts by mass of Exemplified compound (I-38), 20 parts by mass of Exemplified compound (20), 2 parts by mass of Irgacure-819 (trade name, manufactured by Ciba Speciality Chemicals) as a polymerization initiator, and 0.4 part by mass of Exemplified compound (VI-6) as an additive, was applied by spin coating, onto a glass plate on which a polyimide orientation film already subjected to a rubbing treatment was formed, to prepare a thin film. After heating the resultant thin film at a substrate temperature of 110° C., the temperature was cooled down to 77° C. at a rate of 5° C./min. Thereafter, an orientation state of the optical anisotropic layer was fixed by irradiating ultraviolet rays of 1000 mJ/cm$^2$ under the oxygen density of 5% or less, thereby to prepare an anisotropic material 31. From observation of the anisotropic material using a polarization microscope, it was found that there was almost no defect and orientation was uniform. Further, it was found that there was a slow phase axis to the rubbing direction. Retardation at a measurement wavelength of 587 nm was 165 nm. A film thickness at this time was 0.96 μm.

Comparative Example 3

A coating solution was prepared in the same manner as in Example 3, except that 100 parts by mass of Exemplified compound (I-38) was used alone in place of the combination of Exemplified compound (I-38) and Exemplified compound (20). Then, the prepared coating solution was coated on the same glass substrate as used in Example 3. After heating the resultant thin film at a substrate temperature of 130° C., the temperature was cooled down to 100° C. at a rate of 5° C./min. Thereafter, an orientation state of the optical anisotropic layer was fixed to prepare an Anisotropic material 32. By observation of the anisotropic material using a polarization microscope, it was found that a uniform orientation state was not achieved, and both a dark field portion and a horizontal orientation portion were present in a mixing state.

Example 4

A chloroform solution comprised of 15% of a mixture of 50 parts by mass of Exemplified compound (I-35), 50 parts by mass of Exemplified compound (20), 10 parts by mass of dipentaerythritolhexacrylate (DPHA), 2 parts by mass of Irgacure-819 (trade name, manufactured by Ciba Speciality Chemicals) as a polymerization initiator, and 0.4 part by mass of Exemplified compound (VI-6) as an additive, was applied by spin coating, onto a glass plate on which a polyimide orientation film already subjected to a rubbing treatment was formed, to prepare a thin film. After heating the resultant thin film at a substrate temperature of 155° C., the temperature was cooled down to 127° C. at a rate of 5° C./min. Thereafter, an orientation state of the optical anisotropic layer was fixed by irradiating ultraviolet rays of 1000 mJ/cm$^2$ under the oxygen density of 5% or less, thereby to prepare an anisotropic material 41. From observation of the anisotropic material using a polarization microscope, it was found that there was almost no defect and orientation was uniform. Further, it was found that there was a slow phase axis to the rubbing direction. Retardation at a measurement wavelength of 587 nm was 157 nm. A film thickness at this time was 1.01 μm.

Comparative Example 4

A coating solution was prepared in the same manner as in Example 4, except that 50 parts by mass of Exemplified compound (I-35) and 50 parts by mass of Exemplified compound (20) were used in combination in place of the combination of Exemplified compound (I-35), Exemplified compound (20) and DPHA. Then, the prepared coating solution was coated on the same glass substrate as used in Example 4. After heating the resultant thin film at a substrate temperature of 145° C., the temperature was cooled down to 115° C. at a rate of 5° C./min. Thereafter, an orientation state of the optical anisotropic layer was fixed to prepare an anisotropic material 42. By observation of the anisotropic material using a polarization microscope, it was found that there was a domain, so that a uniform orientation state was not achieved.

Having described our invention as related to the present embodiments, it is our intention that the invention not be limited by any of the details of the description, unless otherwise specified, but rather be construed broadly within its spirit and scope as set out in the accompanying claims.

The invention claim is:

1. A liquid crystal composition, comprising at least one compound represented by formula (I) and at least one compound represented by formula (II):

Q1-SP1-X1-MG-X2-SP2-Q2      Formula (I)

wherein Q1 and Q2 each independently represent an ethylenically unsaturated polymerizable group, SP1 and SP2 each independently represent a divalent linking group selected from the group consisting of —O—, —S—, —CO—, —NR'— (R' represents an alkyl group having 1 to 7 carbon atoms, or a hydrogen atom), a divalent chain group and a group made by any combination of two or more thereof, X1 and X2 each independently represent a single bond, —O—, —CO—O—, —O—CO—, —CO—NH—, —NH—CO— or —O—CO—O—, and MG is represented by formula (MG-1):

-(A1-Z¹)m-A2-Z²-A3-      Formula (MG-1)

wherein A1, A2 and A3 each independently represent a 1,4-phenylene group, a heterocyclic group in which one, or two or more CH groups of a 1,4-phenylene group have been replaced by a nitrogen atom (N), a 1,4-cyclohexylene group, a heterocyclic group in which one $CH_2$ group, or two $CH_2$ groups that are not adjacent to each other of a 1,4-cyclohexylene group have been replaced by an oxygen atom (O) and/or a sulfur atom (S), a 1,4-cyclohexenylene group, or a naphthalene-2,6-diyl group, each of which may have a substituent; $Z^1$ and $Z^2$ each independently represent —COO—, —OCO—, —CH₂CH₂—, —OCH₂—, —CH₂O—, —CH=CH—, —C≡C—, —CH=CH—COO—, —OCO—CH=CH— or a single bond; and m represents an integer of 0, 1 or 2, and

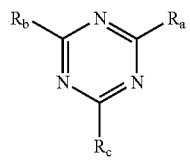

Formula (II)

wherein $R_a$, $R_b$ and $R_c$ each independently represent -$L_1$-$R_1$, -$L_2$-$R_2$ or —NHR; at least one of $R_a$, $R_b$ and $R_c$ is —NHR; $L_1$ and $L_2$ each independently represent a single bond or a divalent linking group; $R_1$ and $R_2$ each independently represent a hydrogen atom or a substituent; and R represents a group having a polymerizable group.

2. The liquid crystal composition according to claim 1, wherein two or three of $R_a$, $R_b$ and $R_c$ in formula (II) are —NHR.

3. The liquid crystal composition according to claim 1, wherein the compound represented by formula (II) is a polymerizable compound represented by formula (III):

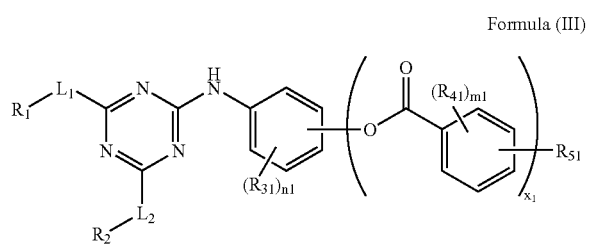

Formula (III)

wherein $L_1$ and $L_2$, which may be the same or different from each other, each independently represent a single bond or a divalent linking group; $R_1$ and $R_2$ each independently represent a hydrogen atom or a substituent; $R_{31}$ and $R_{41}$, which may be the same or different from each other, each independently represent a substituent; n1 represents an integer of 0 (zero) to 4; when n1 is 2 or more, $R_{31}$'s may be the same or different from each other, or $R_{31}$'s may form a ring, if possible; m1 represents an integer of 0 (zero) to 4; when m1 is 2 or more, $R_{41}$'s may be the same or different from each other, or $R_{41}$'s may form a ring, if possible; $X_1$ represents an integer of 0 (zero) to 5; when $X_1$ is 2 or more, $(R_{41})_{m1}$'s may be the same or different from each other; and $R_{51}$ represents an alkoxy group, an alkoxycarbonyl group or an alkoxycarbonyloxy group, each of which has a group represented by P1, P2 or P3, in which an alkoxy moiety of the group represented by $R_{51}$ may have an ether bond therein:

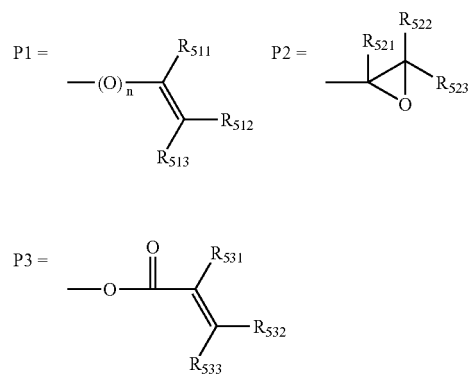

wherein $R_{511}$, $R_{512}$, $R_{513}$, $R_{521}$, $R_{522}$, $R_{523}$, $R_{531}$, $R_{532}$ and $R_{533}$ each independently represent a hydrogen atom or an alkyl group; and n represents 0 (zero) or 1.

4. The liquid crystal composition according to claim 1, wherein the compound represented by formula (II) is a polymerizable compound represented by formula (IV):

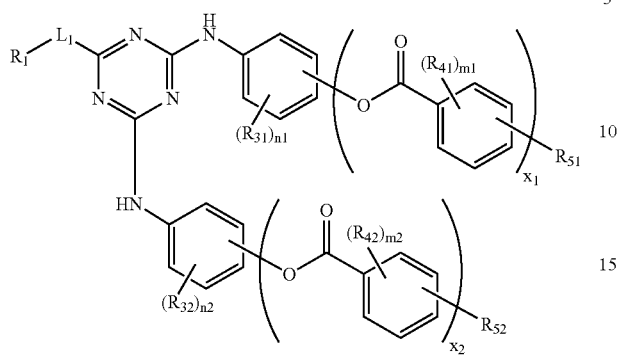

Formula (IV)

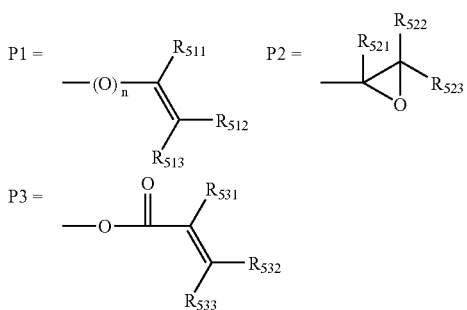

wherein $R_{511}$, $R_{512}$, $R_{513}$, $R_{521}$, $R_{522}$, $R_{523}$, $R_{531}$, $R_{532}$ and $R_{533}$ each independently represent a hydrogen atom or an alkyl group; and n represents 0 (zero) or 1.

5. The liquid crystal composition according to claim 1, wherein the compound represented by formula (II) is a polymerizable compound represented by formula (V):

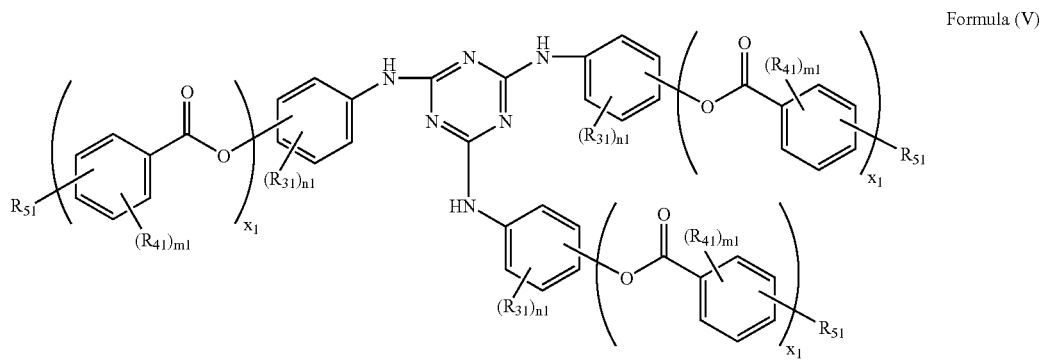

Formula (V)

wherein $L_1$ represents a single bond or a divalent linking group; $R_1$ represents a hydrogen atom or a substituent; $R_{31}$, $R_{32}$, $R_{41}$ and $R_{42}$, which may be the same or different from each other, each independently represent a substituent; n1 and n2 each independently represent an integer of 0 (zero) to 4; when n1 is 2 or more, $R_{31}$'s may be the same or different from each other, or $R_{31}$'s may form a ring, if possible; when n2 is 2 or more, $R_{32}$'s may be the same or different from each other, or $R_{32}$'s may form a ring, if possible; m1 and m2 each independently represent an integer of 0 (zero) to 4; when m1 is 2 or more, $R_{41}$'s may be the same or different from each other, or $R_{41}$'s may form a ring, if possible; when m2 is 2 or more, $R_{42}$'s may be the same or different from each other, or $R_{42}$'s may form a ring, if possible; $X_1$ and $X_2$ each independently represent an integer of 0 (zero) to 5; when $X_1$ is 2 or more, $(R_{41})_{m1}$'s may be the same or different from each other; when $X_2$ is 2 or more, $(R_{42})_{m2}$'s may be the same or different from each other; and $R_{51}$ and $R_{52}$ each independently represent an alkoxy group, an alkoxycarbonyl group or an alkoxycarbonyloxy group, each of which has a group represented by P1, P2 or P3, in which an alkoxy moiety of the group represented by $R_{51}$ may have an ether bond therein;

wherein $R_{31}$ and $R_{41}$, which may be the same or different from each other, each independently represent a substituent; n1 represents an integer of 0 (zero) to 4; when n1 is 2 or more, $R_{31}$'s on a single benzene ring may be the same or different from each other, or may form a ring, if possible; m1 represents an integer of 0 (zero) to 4; when m1 is 2 or more, $R_{41}$'s on a single benzene ring may be the same or different from each other, or may form a ring, if possible; $X_1$ represents an integer of 0 (zero) to 5; when $X_1$ is 2 or more, a series of $(R_{41})_{m1}$'s may be the same or different from each other; and $R_{51}$ represents an alkoxy group, an alkoxycarbonyl group or an alkoxycarbonyloxy group, each of which has a group represented by P1, P2 or P3, in which an alkoxy moiety of the group represented by $R_{51}$ may have an ether bond therein;

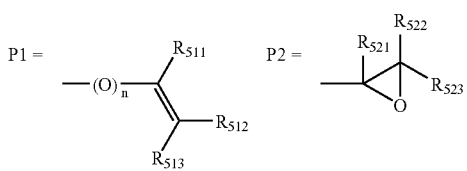

-continued

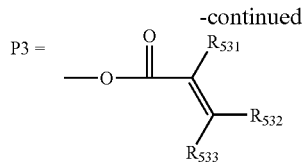

wherein $R_{511}$, $R_{512}$, $R_{513}$, $R_{521}$, $R_{522}$, $R_{523}$, $R_{531}$, $R_{532}$ and $R_{533}$ each independently represent a hydrogen atom or an alkyl group; and n represents 0 (zero) or 1.

6. The liquid crystal composition according to claim 1, wherein the compound represented by formula (II) exhibits liquid crystallinity by itself.

7. The liquid crystal composition according to claim 1, further comprising at least one compound represented by formula (VI):

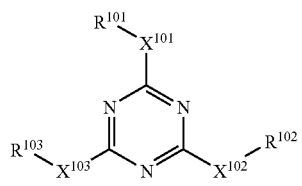

Formula (VI)

wherein $R^{101}$, $R^{102}$ and $R^{103}$ each independently represent a hydrogen atom or a substituent; and $X^{101}$, $X^{102}$ and $X^{103}$ each independently represent a single bond or a divalent linking group.

8. An anisotropic material comprising the liquid crystal composition according to claim 1, wherein liquid crystals of the liquid crystal composition are orientated and fixed.

9. The liquid crystal composition according to claim 7, wherein the compound represented by formula (VI) is a compound represented by formula (VIa) or formula (VIb):

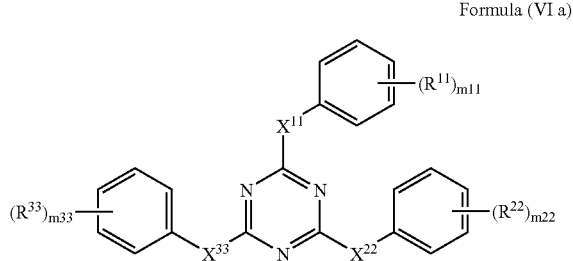

Formula (VI a)

wherein $R^{11}$, $R^{22}$ and $R^{33}$ each independently represent a hydrogen atom or a substituent; $X^{11}$, $X^{22}$ and $X^{33}$ each independently represent —NH—, —O— or —S—; and $m^{11}$, $m^{22}$ and $m^{33}$ each independently represent an integer of 1 to 3; and

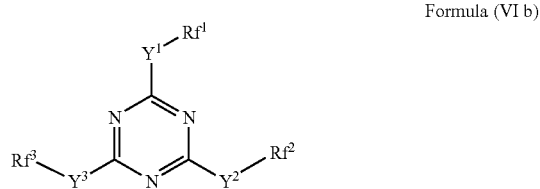

Formula (VI b)

wherein $Rf^1$, $Rf^2$ and $Rf^3$ each independently represent an alkyl group having $CF_3$ group(s) or $CF_2H$ group(s) at its terminal; and $Y^1$, $Y^2$ and $Y^3$ each independently represent a divalent linking group selected from the group consisting of an alkylene group, —CO—, —NH—, —O—, —S—, —$SO_2$—, and a group made by any combination of at least two groups thereof.

* * * * *